United States Patent
Ou et al.

(10) Patent No.: US 10,073,536 B2
(45) Date of Patent: Sep. 11, 2018

(54) VIRTUAL KEYBOARD INPUT FOR INTERNATIONAL LANGUAGES

(71) Applicant: Google Inc., Mountain View, CA (US)

(72) Inventors: Liangyi Ou, Beijing (CN); Zhe Su, Beijing (CN); Yuanbo Zhang, Beijing (CN); Jie Pan, Mountain View, CA (US); Song Fu, Beijing (CN); Zhiheng Li, Beijing (CN); Ruiyi Chen, Beijing (CN); Robert Stuart Jung, Mountain View, CA (US)

(73) Assignee: Google LLC, Mountain View, CA (US)

( * ) Notice: Subject to any disclaimer, the term of this patent is extended or adjusted under 35 U.S.C. 154(b) by 262 days.

(21) Appl. No.: 14/775,978

(22) PCT Filed: Mar. 15, 2013

(86) PCT No.: PCT/CN2013/072755
§ 371 (c)(1),
(2) Date: Sep. 14, 2015

(87) PCT Pub. No.: WO2014/139173
PCT Pub. Date: Sep. 18, 2014

(65) Prior Publication Data
US 2016/0026258 A1    Jan. 28, 2016

(51) Int. Cl.
*G06F 3/023*    (2006.01)
*G06F 3/0488*   (2013.01)
(Continued)

(52) U.S. Cl.
CPC .......... *G06F 3/018* (2013.01); *G06F 3/0237* (2013.01); *G06F 3/044* (2013.01);
(Continued)

(58) Field of Classification Search
CPC ......... G06F 2203/04803; G06F 3/0237; G06F 3/04883; G06F 3/04886; G06F 17/276;
(Continued)

(56) References Cited

U.S. PATENT DOCUMENTS 7,098,896 B2   8/2006   Kushler et al.
7,957,955 B2   6/2011   Christie et al.
(Continued)

FOREIGN PATENT DOCUMENTS

CN    1761989        4/2006
CN    101641661 A    2/2010
(Continued)

OTHER PUBLICATIONS

Fan, Y., "aeviou—gesture based Chinese input method," Intel Innovation Program, http://www.youtube.com/watch?v=fyR8MqaGoiU, uploaded Sep. 6, 2010, 1 page.
(Continued)

*Primary Examiner* — Aaron Lowenberger
(74) *Attorney, Agent, or Firm* — Dority & Manning, P.A.

(57) ABSTRACT

In one example, a computing device includes at least one processor configured to output for display, a graphical keyboard. The at least one processor may also be configured to model, in a first lattice, a plurality of candidate character strings that include symbols of a first alphabet. The first lattice may indicate spatial probabilities of the plurality of candidate character strings. The at least one processor may be configured to determine, using a second lattice that indicates probabilities of one or more words of a second language based at least in part on the spatial probabilities of the plurality of candidate character strings, a probability that the at least one of the plurality of candidate character strings corresponds to at least one word included in the second language. The at least one processor may be configured to
(Continued)

output for display, the one or more symbols representing at least one word.

21 Claims, 10 Drawing Sheets

(51) Int. Cl.
*G06F 3/01* (2006.01)
*G06F 17/27* (2006.01)
*G06F 3/044* (2006.01)

(52) U.S. Cl.
CPC ...... *G06F 3/04883* (2013.01); *G06F 3/04886* (2013.01); *G06F 17/276* (2013.01); *G06F 2203/04101* (2013.01); *G06F 2203/04803* (2013.01); *G06F 2203/04808* (2013.01)

(58) Field of Classification Search
CPC ... G06F 3/18; G06F 3/044; G06F 2203/04101
See application file for complete search history.

(56) References Cited

U.S. PATENT DOCUMENTS

2011/0063231 A1  3/2011  Jakobs et al.
2012/0310626 A1* 12/2012  Kida ............... G06F 17/273
                                               704/8
2013/0067382 A1*  3/2013  Townsend ......... G06F 3/04895
                                               715/773

FOREIGN PATENT DOCUMENTS

| | | |
|---|---|---|
| CN | 101667099 | 3/2010 |
| CN | 101719022 A | 6/2010 |
| JP | 10275046 A | 10/1998 |
| JP | 2012248153 A | 12/2012 |
| WO | WO 2013/107998 A1 * | 7/2013 ......... G06F 3/04883 |

OTHER PUBLICATIONS

Nuance Mobile Channel, "Swype from Nuance—Chinese Demo," http://www.youtube.com/watch?v=fyR8MqaGoiU, published Jun. 19, 2012, 1 page.

Pasden, J., "Aeviou: A Chinese Input Method With Promise," Sinosplice, dated Jan. 25, 2011, http://www.sinosplice.com/life/archives/2011/01/25/aeviou-a-chinese-input-method-with-promise, downloaded Mar. 22, 2017, 11 pages.

PCT International Search Report and Written Opinion dated Dec. 19, 2013 for PCT International Application No. PCT/CN2013/072755, 7 pages.

* cited by examiner

VIRTUAL KEYBOARD INPUT FOR INTERNATIONAL LANGUAGES

CROSS-REFERENCE TO RELATED APPLICATIONS

This application is a 371 U.S. National Stage of International Application No. PCT/CN2013/072755, filed Mar. 15, 2013. The disclosure of the above application is incorporated herein by reference in its entirety.

BACKGROUND

Some computing devices (e.g., mobile phones, tablet computers, etc.) may provide a graphical keyboard as part of a graphical user interface for composing text using a presence-sensitive display (e.g., a screen). The graphical keyboard may enable a user of the computing device to enter text (e.g., an e-mail, a text message, or a document, etc.). For instance, a presence-sensitive display of a computing device may output a graphical (or "soft") keyboard that enables the user to enter data by indicating (e.g., by tapping) keys displayed at the presence-sensitive display.

In some cases, the computing device may present a graphical keyboard with which the user interacts by tapping individual keys of the keyboard or essentially gesturing out a word by sliding his or her finger over the regions associated with the keys. In this way, graphical keyboards provide an input method that allows the user to enter characters, words, or a group of words by one or more gestures. As such, a graphical keyboard may allow the user to achieve a certain degree of efficiency by quickly and accurately entering text.

A computing device that provides a graphical keyboard may utilize word prediction, auto-correction, and/or suggestion techniques for determining a word from a user input. In some international contexts, the keys of the graphical keyboard may be associated with characters in an alphabet of a first language (e.g., English). The user may select one or more keys of the graphical keyboard to enter a string of characters that represents a word and/or character included in a second language (e.g., Chinese, Korean, Japanese, etc.). Using word prediction, auto-correction, and/or suggestion techniques may speed up text entry and reduce spelling mistakes. However, one or more of the techniques may have certain drawbacks. For instance, in some examples, a computing device that provides a graphical keyboard and relies on one or more of the aforementioned techniques may not correctly determine words and/or characters of the second language that were intended by the user from the user input. As such, a user may need to perform additional effort to enter characters and or words of the second language.

SUMMARY

In one example, a method includes outputting, by a computing device and for display, a graphical keyboard comprising a plurality of keys. The at least one of the plurality of keys may be associated with one or more symbols that are included in a first alphabet of a first language. The method may also include, in response to receiving an indication of at least one gesture detected at a presence-sensitive input device, modeling, in a first lattice, a plurality of candidate character strings that each include symbols of the first alphabet. The first lattice may indicate spatial probabilities of each of the plurality of candidate character strings, where the spatial probabilities are based at least in part on the indication of the at least one gesture. The method may include, determining for at least one of the plurality of candidate character strings, using a second lattice that indicates probabilities of one or more words of a second language based at least in part on the spatial probabilities of the plurality of candidate character strings, a probability that the at least one of the plurality of candidate character strings corresponds to at least one word included in the second language. The at least one word may be represented by one or more symbols of a second alphabet corresponding to the second language. The method may include in response to determining that the probability satisfies a threshold, outputting, by the computing device and for display, the one or more symbols representing the at least one word.

In one example, a computer-readable storage medium is encoded with instructions that, when executed, cause at least one processor to output for display, a graphical keyboard comprising a plurality of keys. The at least one of the plurality of keys may be associated with one or more symbols that are included in a first alphabet of a first language. The computer-readable storage medium may be encoded with instructions that cause the at least one processor to, in response to receiving an indication of at least one gesture detected at a presence-sensitive input device, model, in a first lattice, a plurality of candidate character strings that each include symbols of the first alphabet. The first lattice may indicate spatial probabilities of each of the plurality of candidate character strings, where the spatial probabilities are based at least in part on the indication of the at least one gesture. The computer-readable storage medium may be encoded with instructions that cause the at least one processor to determine for at least one of the plurality of candidate character strings, using a second lattice that indicates probabilities of one or more words of a second language based at least in part on the spatial probabilities of the plurality of candidate character strings, a probability that the at least one of the plurality of candidate character strings corresponds to at least one word included in the second language. The at least one word may be represented by one or more symbols of a second alphabet corresponding to the second language. The computer-readable storage medium may be encoded with instructions that cause the at least one processor to, in response to determining that the probability satisfies a threshold, output for display, the one or more symbols representing the at least one word.

In one example, a computing device may include at least one processor, wherein the at least one processor is configured to output for display, a graphical keyboard comprising a plurality of keys. The at least one of the plurality of keys may be associated with one or more symbols that are included in a first alphabet of a first language. The at least one processor of the computing device may be configured to, in response to receiving an indication of at least one gesture detected at a presence-sensitive input device, model, in a first lattice, a plurality of candidate character strings that each include symbols of the first alphabet. The first lattice may indicate spatial probabilities of each of the plurality of candidate character strings, where the spatial probabilities are based at least in part on the indication of the at least one gesture. The at least one processor of the computing device may be configured to determine for at least one of the plurality of candidate character strings, using a second lattice that indicates probabilities of one or more words of a second language based at least in part on the spatial probabilities of the plurality of candidate character strings, a probability that the at least one of the plurality of candidate character strings corresponds to at least one word included in the second language. The at least one word may be represented by one or more symbols of a second alphabet corresponding to the second language. The at least one processor of the computing device may be configured to, in response to determining that the probability satisfies a threshold, output for display, the one or more symbols representing the at least one word.

The details of one or more examples are set forth in the accompanying drawings and the description below. Other features, objects, and advantages of the disclosure will be apparent from the description and drawings, and from the claims.

DETAILED DESCRIPTION

Figure 1:
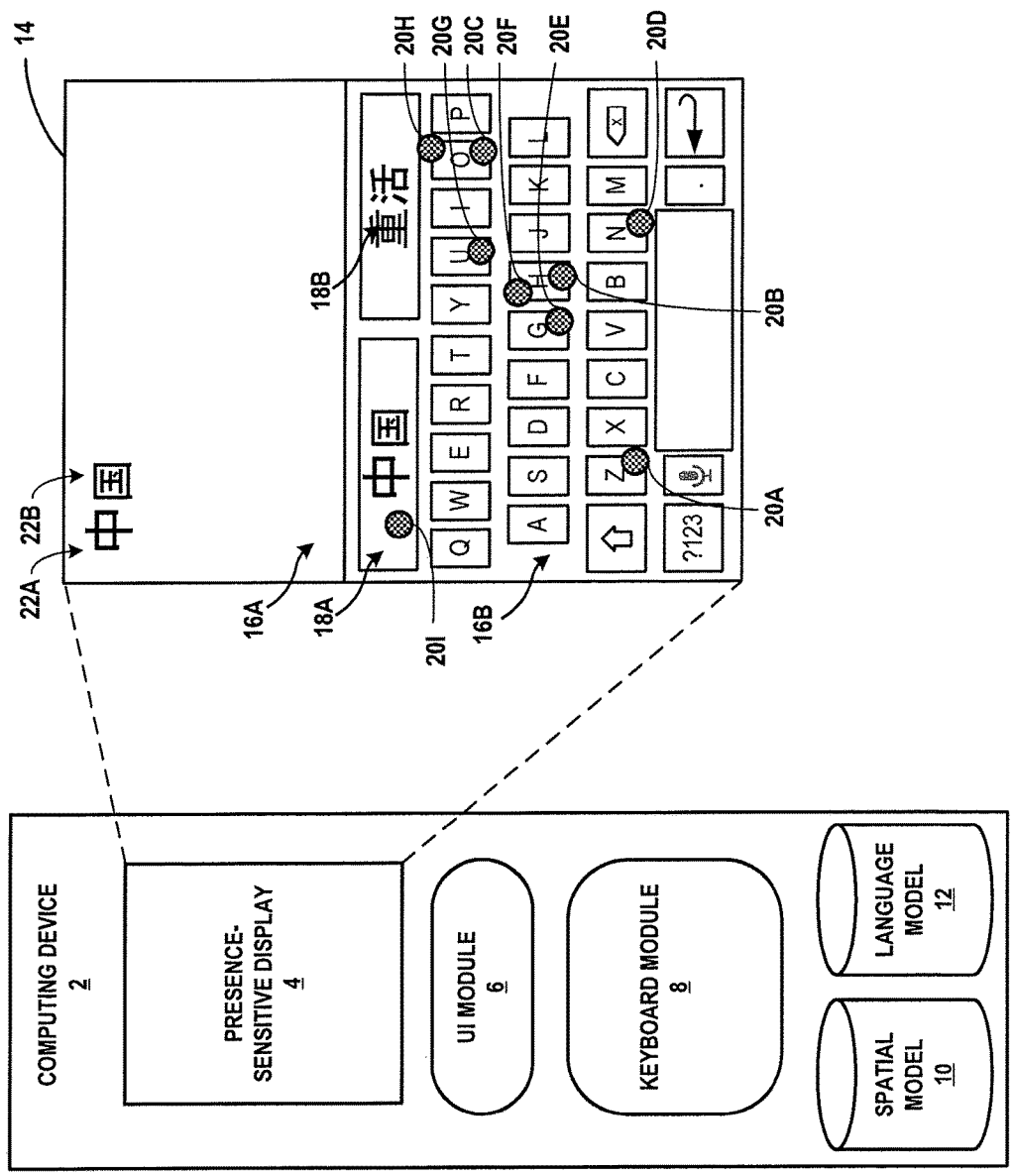
FIG. 1 is a conceptual diagram illustrating an example computing device that is configured to determine one or more characters and/or words of a second language based at least in part on user input to select characters included in an alphabet of a first language, in accordance with one or more aspects of the present disclosure.

In general, this disclosure is directed to techniques for receiving user input at a graphical keyboard that includes keys corresponding characters of an alphabet of a first language, and determining one or more characters and/or words of a second language based at least in part on the user input. For instance, in international contexts, keys of the graphical keyboard may correspond to characters of an alphabet of a first language (e.g., English). To enter characters and/or words in a second language (e.g., Chinese, Korean, Japanese, etc.), the user may provide user inputs to select a group of characters of the first language that, collectively, is a pronunciation representation of one or more characters and/or words in the second language. For instance, a pinyin string may be a group of Latin characters that is collectively a pronunciation representation of a Chinese character or word.

Techniques of the present disclosure may improve the auto-prediction and/or auto-correction of characters and/or words in international contexts using a graphical keyboard. For instance, in accordance with techniques of the disclosure, a computing device may determine indications of user input that correspond to different regions of the graphical keyboard. As the computing device incrementally determines each indication, the computing device may construct one or more candidate character strings that include characters of keys that are proximal to the different selected regions of the graphical keyboard. The computing device may incrementally construct a first lattice that indicates the probabilities of the candidate character strings based on characters of keys that are proximal to the different selected regions of the graphical keyboard. In some examples, the candidate character strings may comprise correctly and/or incorrectly spelled prefixes of pronunciation representations of words in the second language.

As the computing device receives indications of user input, the computing device may also construct a second lattice that indicates probabilities, based on lexical and spatial information, of one or more words of a second language based on the candidate character strings. The computing device may use the second lattice to determine probabilities that words of the second language correspond to the candidate character strings. In some examples, the computing device may output for display one or more words that are associated with probabilities that satisfy a threshold.

In this way, rather than using static key mappings, the computing device may determine, in a probabilistic manner, words of the second language that the user likely intended to input based on the indications of user input to select pronunciation representations of characters and/or words in the second language. Consequently, transliteration techniques of the disclosure may improve the accuracy and/or speed with which the computing device outputs words of the second language. The techniques may reduce or prevent the computing device from erroneously auto-correcting or erroneously predicting a character string from a gesture input. In this way, the techniques may reduce and/or eliminate the need for the user to correct an auto-corrected or predicted word when entering word. Consequently, the computing device may receive fewer inputs from a user to enter words and/or manually correct mistakes and thereby reduce user effort to input character strings. A computing device that receives fewer inputs may, in some examples, perform fewer operations and as such consume less electrical power.

FIG. 1 is a conceptual diagram illustrating an example computing device that is configured to determine one or more characters and/or words of a second language based at least in part on user input to select characters included in an alphabet of a first language, in accordance with one or more aspects of the present disclosure. In the example of FIG. 1, computing device 2 may be a mobile phone. However, in other examples, computing device 2 may be a tablet computer, a personal digital assistant (PDA), a laptop computer, a portable gaming device, a portable media player, an e-book reader, a watch, television platform, or another type of computing device.

As shown in FIG. 1, computing device 2 includes a presence-sensitive display 4. Presence-sensitive display 4 of computing device 2 may function as an input device for computing device 2 and as an output device. In some examples, presence-sensitive display 4 may include an integrated presence-sensitive input device and a display device. For instance, presence-sensitive display 4 may function as a presence-sensitive input device using a presence-sensitive screen, such as a resistive touchscreen, a surface acoustic wave touchscreen, a capacitive touchscreen, a projective capacitance touchscreen, a pressure sensitive screen, an acoustic pulse recognition touchscreen, or another presence-sensitive screen technology. Presence-sensitive display 4 may function as an output device using any one or more of a liquid crystal display (LCD), dot matrix display, light emitting diode (LED) display, organic light-emitting diode (OLED) display, e-ink, or similar monochrome or color display capable of outputting visible information to the user of computing device 2.

Presence-sensitive display 4 of computing device 2 may include a presence-sensitive screen that may detect user input from a user of computing device 2. Presence-sensitive display 4 may receive indications of the user input by detecting one or more tap and/or non-tap gestures, and/or continuous gestures, from a user of computing device 2 (e.g., the user touching or pointing to one or more locations of presence-sensitive display 4 with a finger or a stylus pen). The presence-sensitive screen of presence-sensitive display 4 may present output to a user. Presence-sensitive display 4 may present various user interfaces of applications (e.g., an electronic message application, an Internet browser application, etc.) executing at computing device 2. A user of computing device 2 may interact with one or more of these applications to perform a function with computing device 2 through the respective user interface of each application.

Computing device 2 may include user interface ("UI") module 6 and keyboard module 8. Modules 6 and 8 may perform operations described using software, hardware, firmware, or a mixture of both hardware, software, and firmware residing in and executing on computing device 2. Computing device 2 may execute modules 6 and 8, with multiple processors. Computing device 2 may execute modules 6 and 8 as a virtual machine executing on underlying hardware. Modules 6 and 8 may be implemented in various ways. For example, UI module 6 and/or keyboard module 8 may be implemented as a downloadable or pre-installed application or "app." In another example, UI module 6 and/or keyboard module 8 may be implemented as part of an operating system of computing device 2.

UI module 6 of computing device 2 may receive from presence-sensitive display 4, one or more indications of user input detected presence-sensitive display 4. Generally, each time presence-sensitive display 4 receives an indication of user input detected at a location of the presence-sensitive screen, UI module 6 may receive information about the user input from presence-sensitive display 4. UI module 6 may assemble the information received from presence-sensitive display 4 into a time-ordered set of events indicative of a gesture, such as a sequence of touch events. Each touch event in the sequence may include data or components that represents parameters (e.g., when, where, originating direction) characterizing a presence and/or movement of input at the presence-sensitive screen. Each touch event in the sequence may include a location component corresponding to a location of presence-sensitive display 4, a time component related to when presence-sensitive display 4 detected user input at the location, and an action component related to whether the touch event corresponds to a lift up or a push down at the location. Moreover, one or more of the events may have a concurrent time component, and such events are described as touch events merely for purposes of example and may be indicative of a gesture at any form of presence-sensitive input device.

UI module 6 may determine one or more characteristics of the user input based on the sequence of touch events and include information about these one or more characteristics within each touch event in the sequence of touch events. For example, UI module 6 may determine a start location of the user input, an end location of the user input, a density of a portion of the user input, a speed of a portion of the user input, a direction of a portion of the user input, and a curvature of a portion of the user input. One or more touch events in the sequence of touch events may include (in addition to a time, a location, and an action component as described above) a characteristic component that includes information about one or more characteristics of the user input (e.g., a density, a speed, etc.). UI module 6 may transmit, as output to keyboard module 8, the sequence of touch events including the components or parameterized data associated with each touch event.

In the example of FIG. 1, UI module 6 may cause presence-sensitive display 4 to output example user interface 14. In this example, user interface 14 includes graphical elements displayed at various locations of presence-sensitive display 4. FIG. 1 illustrates edit region 16A of user interface 14, graphical keyboard 16B of user interface 14, and suggested word regions 18A-18C. Edit region 16A may include graphical elements such as images, objects, hyperlinks, characters of text, etc. Graphical keyboard 16B includes graphical elements displayed as keys. Suggested word regions 18A and 18B include suggested words that represent selectable spelling corrections or word suggestions to replace character strings that are included in edit region 16A. In the example of FIG. 1, edit region 16A includes graphical elements displayed as characters 22A-22B of text (e.g., a word). A user of computing device 2 may enter text in edit region 16A by providing user input at locations of presence-sensitive display 4 that display the keys of graphical keyboard 16B.

UI module 6 may act as an intermediary between various components of computing device 2 to make determinations based on input detected by presence-sensitive display 4 and generate output presented by presence-sensitive display 4. For instance, UI module 6 may receive information from keyboard module 8 that includes a representation of a keyboard layout of the keys included in graphical keyboard 16B. UI module 6 may generate touch events based on information about user input detected by presence-sensitive display 4. UI module 6 may determine, based on the location components in the sequence touch events that one or more location components approximate a selection of one or more keys (e.g., UI module 6 may determine the location of one or more of the touch events corresponds to an area of presence-sensitive display 4 that presents graphical keyboard 16B). UI module 6 may transmit, as output to keyboard module 8, the sequence of touch events along with locations where presence-sensitive display 4 presents each of the keys. In response, UI module 6 may receive, as an input from keyboard module 8, a character string and one or more suggested words. UI module 6 may update user interface 14 to include the character string within edit region 16A and one or more suggested words associated with the character string within suggested word region 16C. UI module 6 may cause presence-sensitive display 4 to present the updated user interface 14.

Keyboard module 8 of computing device 2 may transmit, as output to UI module 6 (for inclusion as graphical keyboard 16B of user interface 14) a keyboard layout including a plurality of keys related to one or more written languages (e.g., English, Spanish, etc.). Keyboard module 8 may assign one or more characters or operations to each key of the plurality of keys in the keyboard layout. For instance, keyboard module 8 may generate a QWERTY keyboard layout including keys that represent characters used in typing the English language. The QWERTY keyboard layout may also include keys that represent operations used in typing the English language (e.g., backspace, delete, spacebar, enter, etc.).

Keyboard module 8 may receive data from UI module 6 that represents the sequence of touch events. The touch events may include data representing locations of the presence-sensitive screen of presence-sensitive display 4 where presence-sensitive display 4 presents each of the keys of graphical keyboard 16B. Keyboard module 8 may determine, based on the locations of the keys that the sequence of touch events represents a selection of one or more keys using, e.g., spatial model 10 and language model 12.

To determine one or more keys corresponding to the sequence of touch events, keyboard module 8 may use one or more spatial models, such as spatial model 10. In general, keyboard module 8 may use spatial model 10 to generate one or more probabilities that one or more particular keys of a graphical keyboard have been selected based on location data associated with a user input. In some examples, spatial model 10 includes a bivariate Gaussian model for each key. The bivariate Gaussian model for a key may include a distribution of coordinates (e.g., (x,y) coordinate pairs) that correspond to locations of presence-sensitive display 4 that present the given key. More specifically, in some examples, a bivariate Gaussian model for a key may include a distribution of coordinates that correspond to locations of presence-sensitive display 4 that are most frequently selected by a user when the user intends to select the given key. The shorter the distance between location data of a user input and a higher density area of spatial model 10, the higher the probability that the key associated with spatial model 10 has been selected. A greater distance between location data of a user input and a higher density area of spatial model 10, the lower the probability that the key associated with spatial model 10 has been selected.

Keyboard module 8 may use spatial model 10 to compare the location components (e.g., coordinates) of one or more touch events in the sequence of touch events to respective locations of one or more keys of graphical keyboard 16B and generate a probability based on these comparisons that a selection of a key occurred. In some examples, keyboard module 8 may generate a spatial model score using spatial model 10. The spatial model score may indicate a probability of a selected key based at least in part on locations of presence-sensitive display 4 traversed by a tap or continuous gesture. In some examples, a spatial model score may indicate a combined probability of a group of selected keys based at least in part on locations of UI device 12 traversed by a gesture.

Keyboard module 8 may use spatial model 10 to compare the location component of each touch event in the sequence of touch events to a key location of a particular key of graphical keyboard 16B. The location component of each touch event in the sequence may include one location of presence-sensitive display 4. A key location (e.g., a centroid of a key) of a key in graphical keyboard 16B may include a different location of presence-sensitive display 4. Keyboard module 8 may use spatial model 10 to determine a Euclidian distance between the two locations and generate a probability based on the Euclidian distance that the key was selected. Spatial model 10 may indicate a higher probability for a key that shares a smaller Euclidian distance with one or more touch events than a key that shares a greater Euclidian distance with one or more touch events. Based on the spatial model probability associated with each key, keyboard module 8 may assemble the individual key selections with the highest spatial model probabilities into a time-ordered sequence of keys with corresponding characters that keyboard module 8 may then determine represents a character string. The combined probabilities of each key with associated with a character in the character string may represent a spatial model score for the character string. As further described below, keyboard module 8 may determine for a touch event, probabilities corresponding to multiple keys that are proximate to the location of the touch event. That is, if the touch event indicated a location proximate to the 'Z' key of graphical keyboard 16B, keyboard module 8 may determine a spatial model probability that the 'Z' key was selected, and may also determine spatial model probabilities that the 'X' key and 'S' key were selected.

Keyboard module 8 may use a language model 12 to determine one or more characters and/and or words of a language based on candidate character strings that correspond to sequences of keys indicated by touch events. The candidate character strings may represent characters of different possible sequences of keys indicated by the touch events. As keyboard module 8 receives indications of user input, keyboard module 8 may concurrently determine one or more characters and/or words of a language based on the candidate strings. Keyboard module 8 may access language model 12 to predict and/or autocorrect words that are output for display at presence-sensitive display 4.

Generally, language model 12 of computing device 2 may include a group of words within a language vocabulary. In some examples, language model 12 may be based on and/or include a set of words in a dictionary stored at computing device 2 or a remote computing device that is accessible by computing device 2. Language model 12 may indicate a probability of each respective word based on the frequency with which the word occurs in a given language context. Language model 12 may implement one or more n-gram language models. An n-gram language model may provide a probability distribution for an item $x_i$ (letter, word, punctuation character or other delimiter) in a contiguous sequence of items based on the previous items in the sequence (i.e., $P(x_i|x_{i-(n-1)}, \ldots, x_{i-1})$). Language model 12 is further described herein.

Techniques of the present disclosure may determine, in a probabilistic manner, characters and/or words of a second language (e.g., Chinese) that a user likely intended to input, based on indications of user input corresponding to keys of a graphical keyboard that are associated characters of an alphabet of a first language (e.g., English). For instance, computing device 2 may determine such characters and/or words of the second language, based on indications of user input to enter pronunciation representations (e.g., pinyin strings). The user may input the pronunciation representations using a graphical keyboard that includes keys corresponding to characters of an alphabet of the first language. By probabilistically determining the characters and/or words of the second language in accordance with the techniques of the disclosure, such techniques may reduce the amount of user effort to enter such characters and/or words when the user has inadvertently and/or imprecisely tapped or gestured one or more keys.

For example purposes, the techniques are further described in detail with reference to FIG. 1. In the example of FIG. 1, computing device 2 outputs for display graphical keyboard 16B comprising a plurality of keys. For example, keyboard module 8 may generate data that includes a representation of graphical keyboard 16B. UI module 6 may generate date that includes a representation of user interface 14 and that includes graphical keyboard 16B in user interface 14 based on the data representing graphical keyboard 16B. UI module 6 may send data to presence-sensitive display 4 that includes instructions for displaying user interface 14 at presence-sensitive display 4. Presence-sensitive display 4 may receive the data and cause presence-sensitive display 4 to present user interface 14 including edit region 16A, graphical keyboard 16B, and suggested word region 16C. Graphical keyboard 16B may include a plurality of keys. As shown in FIG. 1, the plurality of keys may be associated with one or more symbols (e.g., characters, words, or any other suitable representation) that are included in a first alphabet of a first language. For example, a key of graphical keyboard 16B may be associated with the 'Z' character of the English alphabet. In other examples, multiple characters may be associated with a key of graphical keyboard 16B. For instance, the characters 'A', 'B', and 'C' may all be associated with a single key, and different user inputs may result in the selection of each of the three different characters.

In the example of FIG. 1, a user may perform a series of tap inputs at input locations 20A-20I. Each of tap locations 20A-20I are indicated by circles in FIG. 1 for example purposes, although presence-sensitive display 4 may not output such dashed circles in some examples, and such portions may be larger and/or smaller in various different examples. For example, the user may wish to enter pinyin strings comprising pronunciation representations for "zhong" and "guo," which collectively form the Chinese word "zhongguo." The word "zhongguo" refers to the country of China and means "middle country." As shown in FIG. 1, the user may attempt to input the key sequence z-h-o-n-g-g-u-o; however, the user may inadvertently tap z-h-o-n-g-h-u-o. For instance, the user may provide inputs to select input locations 20A-20I in the following order: 20A→20B→20C→20D→20E→20F→20G→20F→20G→20H→20I. At input location 20F, the user may inadvertently tap closer to the centroid of the 'h' key than the centroid of the 'g' key, which the user intended to begin the pinyin string "guo." As further described herein, computing device 2, implementing techniques of the disclosure, may output the intended Chinese word 中国 for although the user inadvertently tapped z-h-o-n-g-h-u-o.

UI module 6 may incrementally receive information indicating tap locations 20A-20I from presence-sensitive display 4 and assemble the information into a time-ordered sequence of touch events (e.g., each touch event including a location component, a time component, and an action component). UI module 6 may transmit the touch events to keyboard module 8. Keyboard module 8 may receive the touch events along with the information associated with each touch event (e.g., location, time, action, etc.) from UI module 6.

In response to receiving the indication of at least one gesture detected at presence-sensitive display 4, keyboard module 8 may determine a group of one or more different candidate strings that correspond to the sequence of touch events. For instance, keyboard module 8 may use spatial model 10 to determine that tap location 20A corresponds to the 'z' key of graphical keyboard 16B, tap location 20B corresponds to the 'h' key, tap location 20C corresponds to the 'o' key, tap location 20D corresponds to the 'n' key, and tap location 20E corresponds to the 'g' key. Collectively, the sequence of characters corresponding to the respective keys represents a first candidate string "zhong." Keyboard module 8 may also use spatial model 10 to determine that tap location 20A corresponds to the 'z' key of graphical keyboard 16B, tap location 20B corresponds to the 'h' key, tap location 20C corresponds to the 'o' key, tap location 20D corresponds to the 'm' key, and tap location 20E corresponds to the 'v' key. Collectively, the sequence of characters corresponding to the respective keys represents a second candidate string "zhomv." Keyboard module 8 may therefore incrementally generate multiple candidate strings that each represent different combinations of characters that correspond to keys proximal to tap locations 20A-20H, as touch events are received from UI module 6 by keyboard module 8.

In some examples, each character in a candidate character string may have a corresponding spatial model score that indicates a probability that a tap location corresponds to a key associated with the respective character. That is, the character 'z' may be associated with a spatial model score of 0.64 to indicate the probability that tap input 20A corresponds to the 'z' key of graphical keyboard 16B. Keyboard module 8, in some examples, generates a spatial model score for each candidate string that represents the collective spatial model scores of the characters included in the candidate character string. For instance, keyboard module 8 may generate the spatial model score for the first candidate string "zhong" as the product of the individual spatial model scores for each character in the first candidate string.

In accordance with techniques of the disclosure, as keyboard module 8 receives indications of tap gestures at presence-sensitive display 4, keyboard module 8 may incrementally determine the candidate character strings and spatial model probabilities that correspond to the respective candidate character strings. As previously described, the candidate character strings may include characters of an English alphabet. Keyboard module 8, in some examples, models in a first lattice, one or more of the plurality of candidate character strings that include the characters of the first alphabet (e.g., English). In some examples, each pronunciation representation (e.g., a pinyin string) and/or candidate string may be referred to as a "token," and the first lattice may be referred to as a "token lattice." The token lattice may indicate spatial probabilities for the one or more of the plurality of candidate character strings, which as described above may be based at least in part on indications of the tap gestures.

Figure 4:
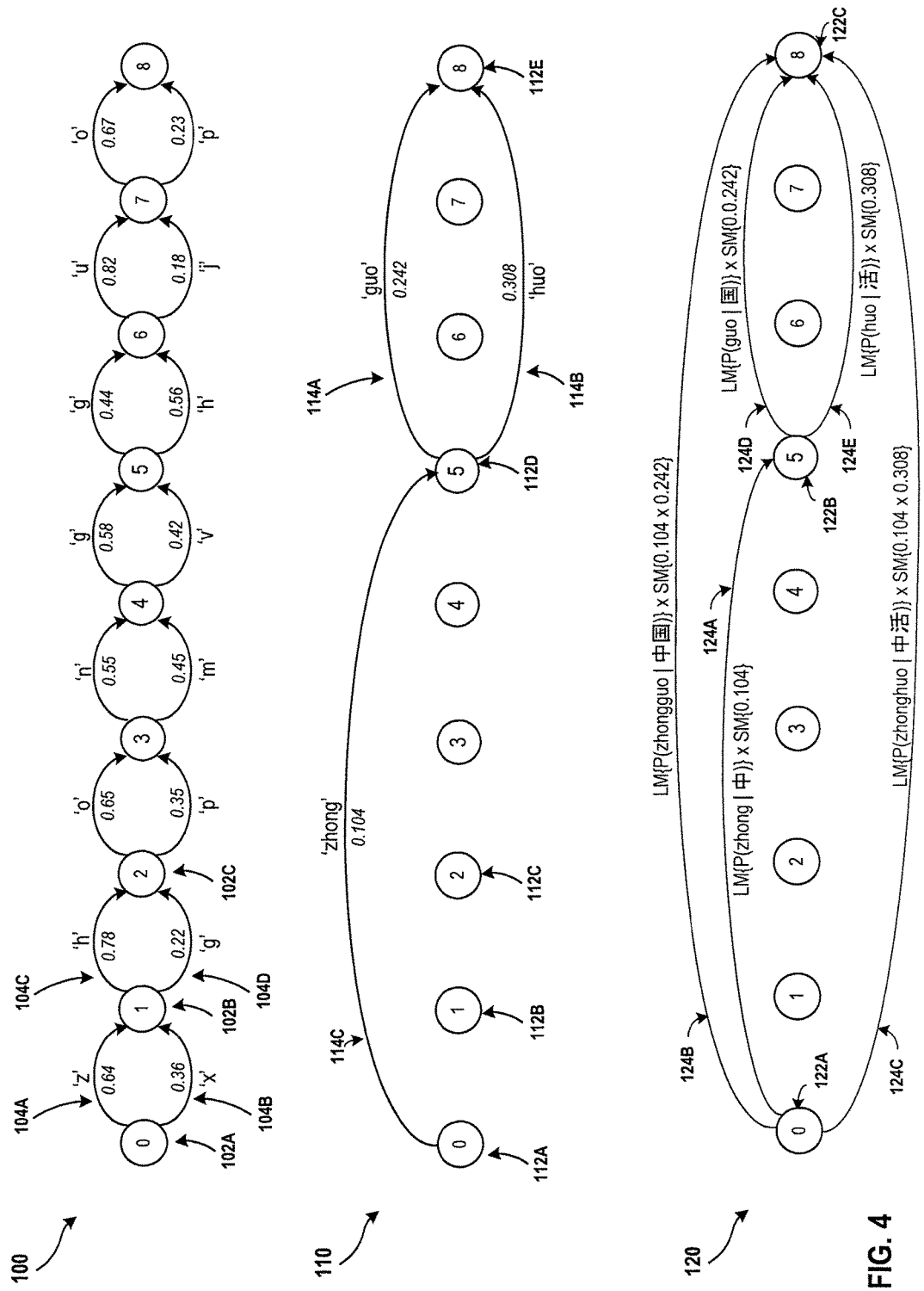
FIG. 4 is a conceptual diagram illustrating lattices, which a computing device may generate based on indications of user input to select characters of an alphabet in a first language and use to determine words of a second language, in accordance with techniques of the present disclosure.

As further illustrated in FIG. 4, the token lattice may be a graph that includes vertexes that are connected by edges. Each vertex may be identified by an index. In some examples, a candidate character string with n characters may be modeled by an edge originating from a vertex with index 0 to a vertex with index n. For instance, keyboard module 8 may associate candidate character string "zhong" with an edge from vertex 0 to vertex 5. As further described in FIG. 4 keyboard module 8 may implement the token lattice using any number of suitable data structures that store state information about edges, vertexes and other corresponding information of the token lattice.

As a part of modeling a candidate character string, keyboard model 8 may further associate a weight with each corresponding edge. In some examples, the weight indicates that spatial model probability of the candidate character string associated with the edge. For instance, the edge from vertex 0 to vertex 5 that is associated with candidate character string "zhong" may be assigned a weight that indicates the spatial model probability of the candidate string "zhong." In various examples, keyboard module 8 may incrementally model each of a plurality of candidate character string using the token lattice as indications of user input, such as taps corresponding to tap locations 20A-20H or portions of a continuous gesture (further illustrated in FIGS. 5-6B), are determined by keyboard module 8.

Keyboard module 8 may determine one or more candidate words of a second language (e.g., Chinese) based on the candidate character strings modeled in the token lattice using a second lattice that indicates probabilities of one or more words of the second language based at least in part on the spatial probabilities of the plurality of candidate character strings. The one or more candidate words of the second language may be represented by one or more symbols (e.g., characters, words, or other suitable graphical indicia) of a second alphabet (e.g., Chinese) of the second language. Such candidate words may represent predicted words from the second language that may correspond to the candidate strings input by the user.

Figure 9:
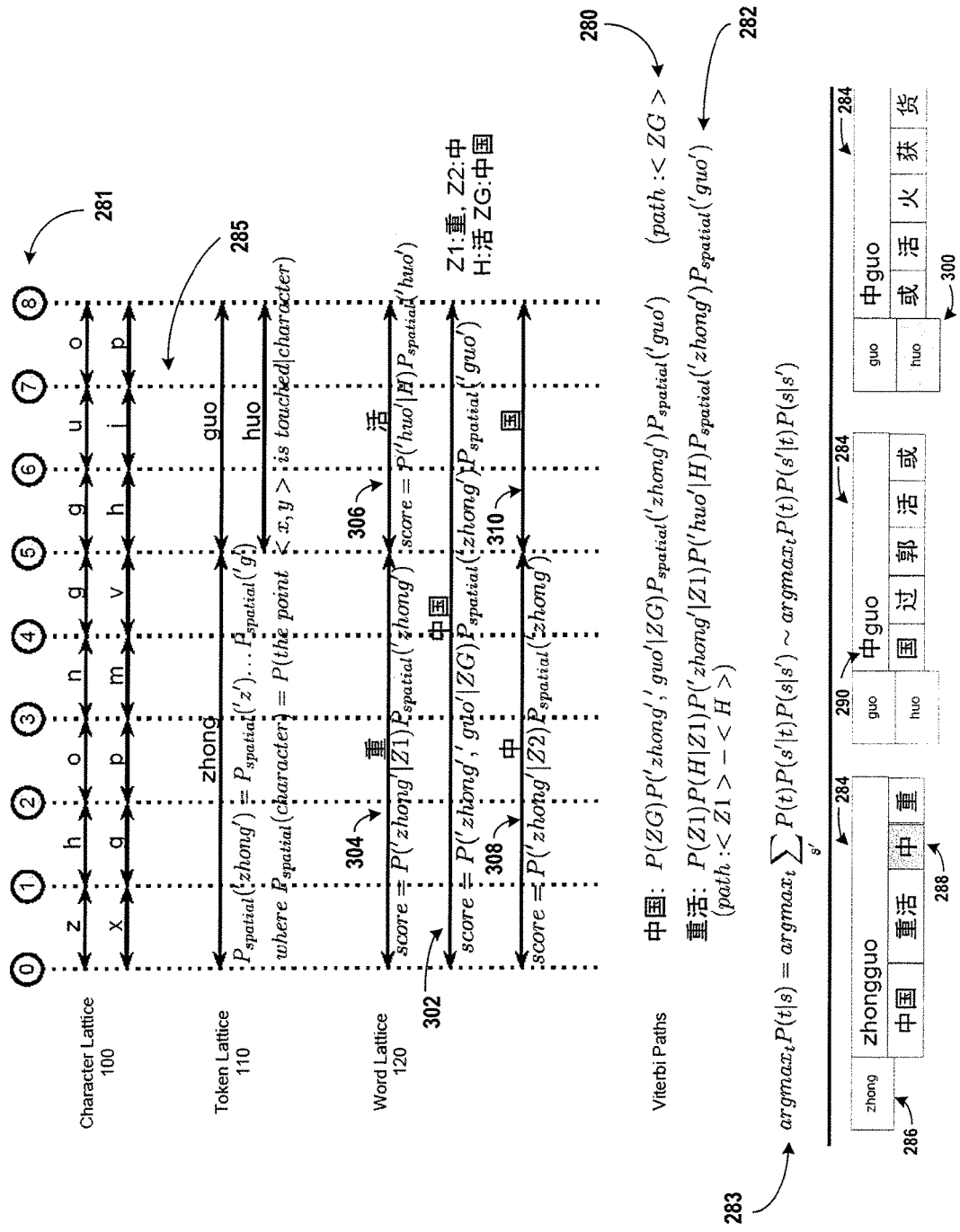
FIG. 9 is a conceptual diagram illustrating lattices, which a computing device may generate based on indications of user input to select characters of an alphabet in a first language and use to determine words of a second language, in accordance with techniques of the present disclosure.

In some examples, each character and/or word in the second language may generally be referred to as a "word," and the second lattice may be referred to as a "word lattice." As with the token lattice, the word lattice may be a graph that includes vertexes that are connected by edges. Each vertex may also be identified by an index. In some examples, a candidate word that includes n characters of an alphabet of a second language may be modeled by an edge originating from a vertex with index 0 to a vertex with index n. For instance, keyboard module 8 may model candidate word "中国," which includes the two Chinese characters 中 and 国, along an edge from vertex 0 to vertex 2. In some examples, builder module 50 models word lattice 120 such that vertexes of word lattice 120 share the same vertex indexes as the vertex indexes of token lattice 110. That is, in some examples, word lattice 120 may include vertexes with the same vertex indexes as token lattice 110. Further examples are illustrated in FIG. 9. As further described in FIG. 4 keyboard module 8 may implement the word lattice using any number of suitable data structures that store state information about edges, vertexes and other corresponding information of the token lattice.

As a part of modeling a candidate string, keyboard model 8 may further associate a weight with each corresponding edge. The weight of an edge may represent a probability of a group of one or more candidate strings, given one or more words included in the second language. Keyboard module 8 may determine the weight based on spatial and language model probabilities. For instance, the weight of an edge may be based at least in part on the language model probability of 'zhonghuo' given the Chinese word "中国", which may be a word in the Chinese language that is included in language model 12. In other words, keyboard module 8 may determine a probability that, given the Chinese word "中国" ("zuhongguo") is the word intended by the user to be inputted, the user inputted the candidate string "zhonghuo", which includes two candidate strings, "zhong" and "huo". As further described in FIG. 4, the language model probability of "zhonghuo" given "中国" may be based on, for example, the frequency with which "中国" occurs in the Chinese language, the language context in which the indications of user input are received (e.g., using an n-gram language model), etc. As previously indicated above, the user may have inadvertently typed "huo" rather than the character string "guo" when intending to input "zhongguo", which corresponds to the Chinese word "中国". Keyboard module 8 may therefore create multiple edges in the word lattice that indicate the probabilities of different candidate character string combinations given a Chinese word "中国". In this way, if a user inadvertently taps an unintended or incorrect character, such as the 'h' key instead of the 'g' when inputting 'guo', keyboard module 8 provides techniques for determining words of the second language by testing multiple different candidate character strings. In this way, the techniques provide word prediction techniques that are more resilient to user input errors, thereby improving the user experience and reducing the amount of user effort to input text.

Keyboard module 8 may determine the weight of the edge for "zhonghuo" based at least in part on a combined spatial model probability of the "zhong" and "huo", which collectively may comprise the character string "zhonghuo" corresponding to an edge in the word lattice for the word "中国". That is, keyboard module 8 may determine a combined spatial model probability in some examples the comprises the product of the spatial model probability for the candidate string "zhong" and the spatial model probability for the candidate string "huo".

Keyboard module 8, in some examples, determines the weight of an edge in the word lattice based at least in part on the combined spatial model probability and language model probability for a given word included in language model 12 (e.g., "中国") and a group of one or more candidate strings (e.g., "zhonghuo"). In some examples, keyboard module 8 may add or multiply the combined spatial model probability and language model probability to generate a combined weight that indicates that overall probability of one or more candidate strings given a word included in a language model. A larger weight for a given edge may indicate a higher probability that the word of the second language corresponding to the edge was intended by user. A smaller weight for a given edge may indicate a lower probability that the word corresponding to the edge was intended by user. In various examples, keyboard module 8 may incrementally determine one or more words included in language model 12 using the word lattice based on the candidate strings, as indications of user input are determined by keyboard module 8.

Keyboard module 8 may output the one or more candidate words or phrases and associated weights to UI module 6 for inclusion either in edit region 16A of user interface 14, or as individual suggested words in suggested word regions 18A and 18B of user interface 14. For example, keyboard module 8 may determine one or more candidate words associated with edges that have weights that satisfy a threshold. As one example, keyboard module 8 may determine the two candidate words with the two highest weights from the word lattice. Keyboard module 8 may send data representing the two word candidates to UI module 6. UI module 6 may receive the data representing the one or more candidate words or phrases (including the raw character string) from keyboard module 8 along with the weights or ranks corresponding to the weights of the one or more candidate words or phrases.

UI module 6 may update suggested word region 18A by including the highest ranking candidate word as suggested word "中国". UI module 6 may update suggested word region 18B by including the second-highest candidate word as suggested word "重 活". From user interface 14, the user can provide a user input at tap location 20I to suggested word 18A by tapping or providing an input proximal to a location of presence-sensitive display 4 where presence-sensitive display 4 outputs suggested word 18A. For example, the user tap over the location of presence-sensitive display 4 where presence-sensitive display 4 presents suggested word 18A, e.g., "中国". Tapping over suggested word 38A may cause UI module 6 to update user interface 14 and "中国" in edit region 16A.

In this way, the techniques of the disclosure may enable a computing device to output characters and/or words of a second language intended by a user although indications of user input may include inadvertent and/or incorrect user inputs. For instance, in the above example, although the user may have inadvertently tapped "huo" rather than "guo" as intended, keyboard module 8 outputted the intended word "中国" based on the weight of the word lattice. As such, the techniques may enable a user to more quickly enter text in a second language at a computing device using a keyboard that includes an alphabet of a first language. Since the user may provide fewer inputs to correct the computing device and/or enter text, computing device implementing techniques of the disclosure may execute fewer operations, and as a result, consume less electrical power.

Figure 2:
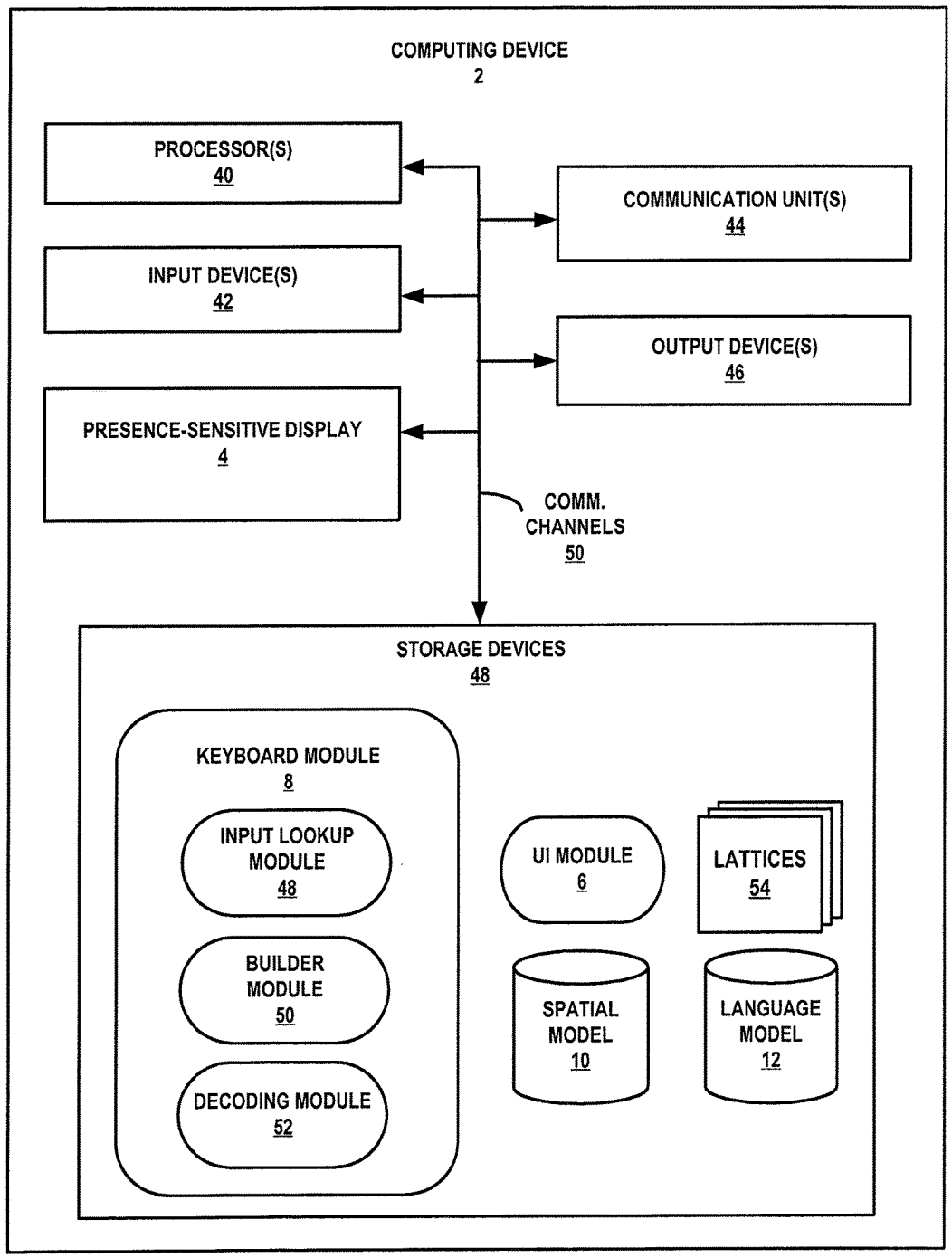
FIG. 2 is a block diagram illustrating further details of one example of a computing device as shown in FIG. 1, in accordance with one or more techniques of the present disclosure.

FIG. 2 is a block diagram illustrating an example computing device, in accordance with one or more aspects of the present disclosure. Computing device 2 of FIG. 2 is described below within the context of FIG. 1. FIG. 2 illustrates only one particular example of computing device 2, and many other examples of computing device 2 may be used in other instances and may include a subset of the components included in example computing device 2 or may include additional components not shown in FIG. 2.

As shown in the example of FIG. 2, computing device 2 includes presence-sensitive display 4, one or more processors 40, one or more input devices 42, one or more communication units 44, one or more output devices 46, and one or more storage devices 48. Storage devices 48 of computing device 2 also include UI module 6, keyboard module 8, input lookup module 48, builder module 50, decoding module 52, one or more lattices 54, spatial model 10 and language module 12. Communication channels 50 may interconnect each of the components 4, 40, 42, 44, 46, 48, 8, 48, 50, 52, 6, 54, 10, and 12, for inter-component communications (physically, communicatively, and/or operatively). In some examples, communication channels 50 may include a system bus, a network connection, an inter-process communication data structure, or any other method for communicating data.

One or more input devices 42 of computing device 2 may receive input. Examples of input are tactile, audio, and video input. Input devices 42 of computing device 2, in one example, includes a mouse, keyboard, voice responsive system, video camera, microphone or any other type of device for detecting input from a human or machine. In some examples, input device 42 may be a presence-sensitive input device, which may include presence-sensitive screen, touch-sensitive screen, etc.

One or more output devices 46 of computing device 2 may generate output. Examples of output are tactile, audio, and video output. Output devices 46 of computing device 2, in one example, includes a presence-sensitive screen, sound card, video graphics adapter card, speaker, cathode ray tube (CRT) monitor, liquid crystal display (LCD), or any other type of device for generating output to a human or machine. Output devices 46 may include display devices such as cathode ray tube (CRT) monitor, liquid crystal display (LCD), or any other type of device for generating visual output.

One or more communication units 44 of computing device 2 may communicate with external devices via one or more networks by transmitting and/or receiving network signals on the one or more networks. For example, computing device 2 may use communication unit 44 to transmit and/or receive radio signals on a radio network such as a cellular radio network. Likewise, communication units 44 may transmit and/or receive satellite signals on a satellite network such as a GPS network. Examples of communication unit 44 include a network interface card (e.g. such as an Ethernet card), an optical transceiver, a radio frequency transceiver, a GPS receiver, or any other type of device that can send and/or receive information. Other examples of communication units 44 may include Bluetooth®, GPS, 3G, 4G, and Wi-Fi® radios found in mobile devices as well as Universal Serial Bus (USB) controllers.

In some examples, presence-sensitive display 4 of computing device 2 may include functionality of input devices 42 and/or output devices 46. In the example of FIG. 2, presence-sensitive display 4 may be or may include a presence-sensitive input device, such as a presence-sensitive screen, touch-sensitive screen, etc. In some examples, a presence sensitive screen may detect an object at and/or near the presence-sensitive screen. As one example range, a presence-sensitive screen may detect an object, such as a finger or stylus that is within 2 inches or less of the presence-sensitive screen. The presence-sensitive screen may determine a location (e.g., an (x,y) coordinate) of the presence-sensitive screen at which the object was detected. In another example range, a presence-sensitive screen may detect an object 6 inches or less from the presence-sensitive screen and other ranges are also possible. The presence-sensitive screen may determine the location of the screen selected by a user's finger using capacitive, inductive, and/or optical recognition techniques. In some examples, presence-sensitive display 4 provides output to a user using tactile, audio, or video stimuli as described with respect to output device 46. In the example of FIG. 2, presence-sensitive display 4 presents a user interface, such as user interface 14 of FIG. 1.

While illustrated as an internal component of computing device 2, presence-sensitive display 4 may also represent an external component that shares a data path with other components of computing device 2 for transmitting and/or receiving input and output. For instance, in one example, presence-sensitive display 4 represents a built-in component of computing device 2 located within and physically connected to the external packaging of computing device 2 (e.g., a screen on a mobile phone). In another example, presence-sensitive display 4 may be an external component of computing device 2 located outside and physically separated from the packaging of computing device 2 (e.g., a monitor, a projector, etc. that shares a wired and/or wireless data path with a tablet computer).

One or more storage devices 48 within computing device 2 may store information for processing during operation of computing device 2. In some examples, storage device 48 is a temporary memory, meaning that a primary purpose of storage device 48 is not long-term storage. Storage devices 48 on computing device 2 may configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 48, in some examples, also include one or more computer-readable storage media. Storage devices 48 may be configured to store larger amounts of information than volatile memory. Storage devices 48 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 48 may store program instructions and/or data associated with UI module 6, keyboard module 8, input lookup module 48, builder module 50, decoding module 52, one or more lattices 54, spatial model 10 and language module 12.

One or more processors 40 may implement functionality and/or execute instructions within computing device 2. For example, processors 40 on computing device 2 may receive and execute instructions stored by storage devices 48 that execute the functionality of UI module 6, keyboard module 8, input lookup module 48, builder module 50, decoding module 52, one or more lattices 54, spatial model 10 and language module 12. These instructions executed by processors 40 may cause computing device 2 to store information, within storage devices 48 during program execution. Processors 40 may execute instructions of UI module 6, keyboard module 8, input lookup module 48, builder module 50, decoding module 52, one or more lattices 54, spatial model 10 and language module 12 to cause presence-sensitive display 4 to display user interface 14 with edit region 16A, graphical keyboard 16B, and suggested word regions 18A-18B at presence-sensitive display 4. That is, modules UI module 6, keyboard module 8, input lookup module 48, builder module 50, decoding module 52, one or more lattices 54, spatial model 10 and language module 12 may be operable by processors 40 to perform various actions, including receiving an indication of a gesture at locations of the presence-sensitive screen of presence-sensitive display 4 and causing presence-sensitive display 4 to present user interface 14 at presence-sensitive display 4.

In accordance with aspects of this disclosure keyboard module 8 may initially send data to UI module 6 that causes presence-sensitive display 4 to output a graphical keyboard for display. The graphical keyboard may include a plurality of keys. At least one of the plurality of keys is may be associated with one or more symbols that are included in a first alphabet of a first language. For instance, in some examples, one or more keys may be associated with a single character that is included in the English alphabet. In another example, one or more keys may each be associated with multiple characters that are included in English alphabet. While examples of the disclosure may refer to the first language was English for example purposes, the first language may be any language and the first alphabet of the first language may be any alphabet. Symbols may generally refer to characters, words, or other graphical representations of constructs in an alphabet and/or language.

In some examples, a user may perform a tap and/or continuous gesture at region of presence-sensitive display 4 that outputs the graphical keyboard for display. In response to receiving an indication of at least one gesture detected at presence-sensitive input device 4, builder module 50 may model, in a first lattice, a plurality of character strings that each includes symbols of the first alphabet. The first lattice may indicate spatial probabilities of each of the plurality of character strings. In some examples, the spatial probabilities are based at least in part on the indication of the at least one gesture.

In some examples, builder module 50 may determine for at least one of the plurality of character strings, using a second lattice that indicates probabilities of one or more words of a second language based at least in part on the spatial probabilities of the plurality of character strings, a probability that the at least one of the plurality of character strings corresponds to at least one word included in the second language. As further described in FIG. 4, an edge of word lattice 120 may indicate a probability that the at least one of the plurality of character strings corresponds to at least one word included in the second language. The at least one word may be represented by one or more symbols of a second alphabet corresponding to the second language.

Decoding module 52 may, in some examples, in response to determining that the at one probability satisfies a threshold, may send data to UI module 6 that causes presence-sensitive display 4 to output for display, the one or more symbols representing at least one word. For example, decoding module 52, as further described in FIG. 4 may determine weights of one or more edges word lattice 120 as illustrated in FIG. 4. Decoding module 52 may determine that weights of one or more of the edges satisfy a threshold. For instance, decoding module 52 may determine that one or more weights are greater than a threshold. In such examples, decoding module 52 may send data to UI module 6 that causes presence-sensitive display 4 to output for display the words associated with the edges. While techniques of the disclosure are described with respect to outputting words of a second language, the techniques may also be used to predict, auto-correct, and/or output single characters, multi-word phrases, sentences, etc.

Figure 3:
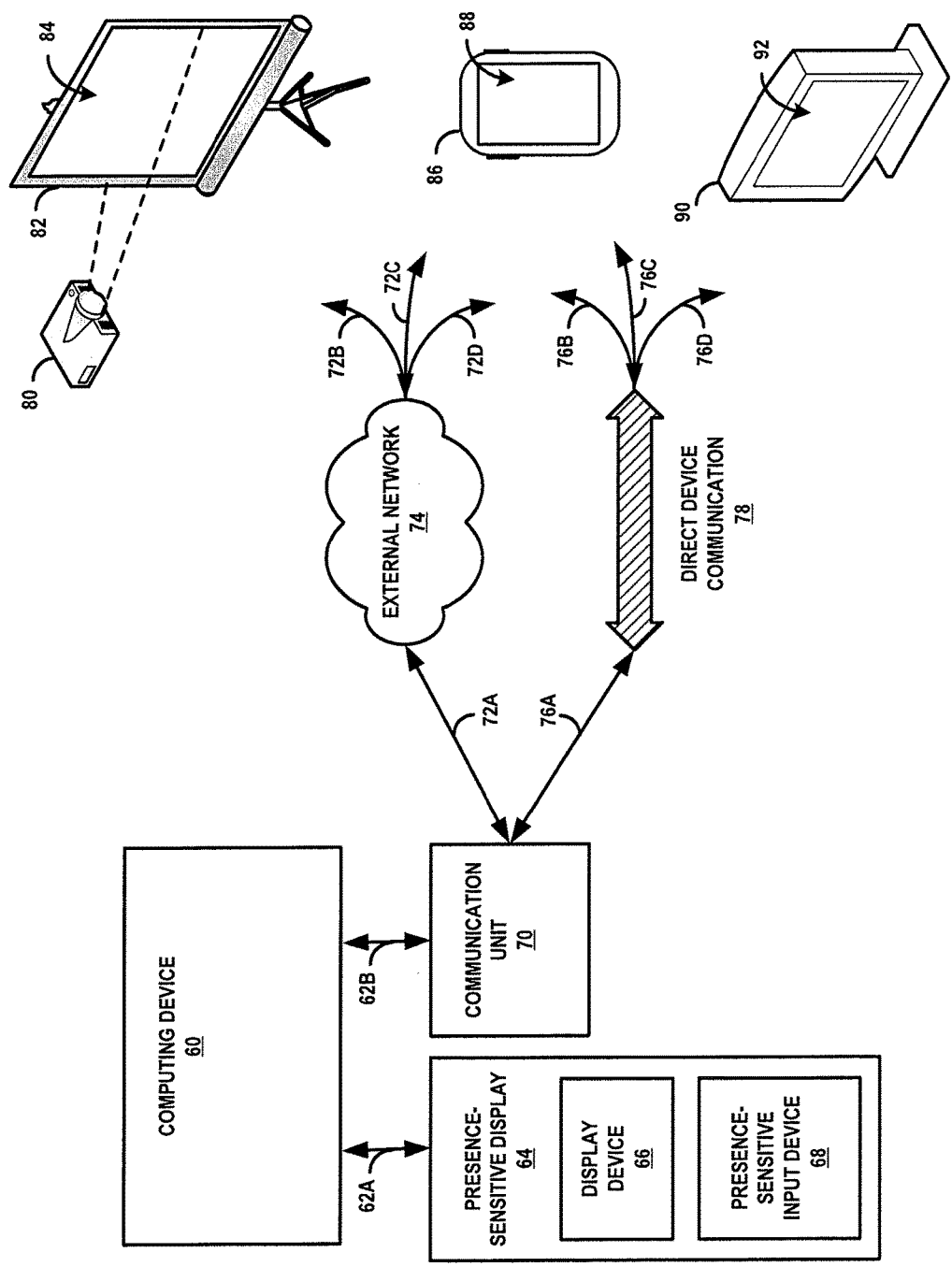
FIG. 3 is a block diagram illustrating an example computing device that outputs graphical content for display at a remote device, in accordance with one or more techniques of the present disclosure.

FIG. 3 is a block diagram illustrating an example computing device that outputs graphical content for display at a remote device, in accordance with one or more techniques of the present disclosure. Graphical content, generally, may include any visual information that may be output for display, such as text, images, a group of moving images, etc. The example shown in FIG. 3 includes a computing device 60, presence-sensitive display 64, communication unit 70, projector 80, projector screen 82, mobile device 86, and visual display device 90. Although shown for purposes of example in FIGS. 1 and 2 as a stand-alone computing device 10, a computing device such as computing device 60 may, generally, be any component or system that includes a processor or other suitable computing environment for executing software instructions and, for example, need not include a presence-sensitive display.

As shown in the example of FIG. 3, computing device 60 may be a processor that includes functionality as described with respect to processor 40 in FIG. 2. In such examples, computing device 60 may be operatively coupled to presence-sensitive display 64 by a communication channel 62A, which may be a system bus or other suitable connection. Computing device 60 may also be operatively coupled to communication unit 70, further described below, by a communication channel 62B, which may also be a system bus or other suitable connection. Although shown separately as an example in FIG. 3, computing device 60 may be operatively coupled to presence-sensitive display 64 and communication unit 70 by any number of one or more communication channels.

In other examples, such as illustrated previously by computing device 10 in FIGS. 1-2, a computing device may refer to a portable or mobile device such as mobile phones (including smart phones), laptop computers, etc. In some examples, a computing device may be a desktop computers, tablet computers, smart television platforms, cameras, personal digital assistants (PDAs), servers, mainframes, etc.

Presence-sensitive display 64, like presence-sensitive display 4 as shown in FIG. 1, may include display device 66 and presence-sensitive input device 68. Display device 66 may, for example, receive data from computing device 60 and display the graphical content. In some examples, presence-sensitive input device 68 may determine one or more user inputs (e.g., continuous gestures, multi-touch gestures, single-touch gestures, etc.) at presence-sensitive display 64 using capacitive, inductive, and/or optical recognition techniques and send indications of such user input to computing device 60 using communication channel 62A. In some examples, presence-sensitive input device 68 may be physically positioned on top of display device 66 such that, when a user positions an input unit over a graphical element displayed by display device 66, the location at which presence-sensitive input device 68 corresponds to the location of display device 66 at which the graphical element is displayed.

As shown in FIG. 3, computing device 60 may also include and/or be operatively coupled with communication unit 70. Communication unit 70 may include functionality of communication unit 44 as described in FIG. 2. Examples of communication unit 70 may include a network interface card, an Ethernet card, an optical transceiver, a radio frequency transceiver, or any other type of device that can send and receive information. Other examples of such communication units may include Bluetooth, 3G, and WiFi radios, Universal Serial Bus (USB) interfaces, etc. Computing device 60 may also include and/or be operatively coupled with one or more other devices, e.g., input devices, output devices, memory, storage devices, etc. that are not shown in FIG. 3 for purposes of brevity and illustration.

FIG. 3 also illustrates a projector 80 and projector screen 82. Other such examples of projection devices may include electronic whiteboards, holographic display devices, and any other suitable devices for displaying graphical content. Projector 80 and projector screen 82 may include one or more communication units that enable the respective devices to communicate with computing device 60. In some examples, the one or more communication units may enable communication between projector 80 and projector screen 82. Projector 80 may receive data from computing device 60 that includes graphical content. Projector 80, in response to receiving the data, may project the graphical content onto projector screen 82. In some examples, projector 80 may determine one or more user inputs (e.g., continuous gestures, multi-touch gestures, single-touch gestures, etc.) at projector screen using optical recognition or other suitable techniques and send indications of such user input using one or more communication units to computing device 60. In such examples, projector screen 82 may be unnecessary, and projector 80 may project graphical content on any suitable medium and detect one or more user inputs using optical recognition or other such suitable techniques.

Projector screen 82, in some examples, may include a presence-sensitive display 84. Presence-sensitive display 84 may include a subset of functionality or all of the functionality of UI device 4 as described in this disclosure. In some examples, presence-sensitive display 84 may include additional functionality. Projector screen 82 (e.g., an electronic whiteboard), may receive data from computing device 60 and display the graphical content. In some examples, presence-sensitive display 84 may determine one or more user inputs (e.g., continuous gestures, multi-touch gestures, single-touch gestures, etc.) at projector screen 82 using capacitive, inductive, and/or optical recognition techniques and send indications of such user input using one or more communication units to computing device 60.

FIG. 3 also illustrates mobile device 86 and visual display device 90. Mobile device 86 and visual display device 90 may each include computing and connectivity capabilities. Examples of mobile device 86 may include e-reader devices, convertible notebook devices, hybrid slate devices, etc. Examples of visual display device 90 may include other semi-stationary devices such as televisions, computer monitors, etc. As shown in FIG. 3, mobile device 86 may include a presence-sensitive display 88. Visual display device 90 may include a presence-sensitive display 92. Presence-sensitive displays 88, 92 may include a subset of functionality or all of the functionality of presence-sensitive display 4 as described in this disclosure. In some examples, presence-sensitive displays 88, 92 may include additional functionality. In any case, presence-sensitive display 92, for example, may receive data from computing device 60 and display the graphical content. In some examples, presence-sensitive display 92 may determine one or more user inputs (e.g., continuous gestures, multi-touch gestures, single-touch gestures, etc.) at projector screen using capacitive, inductive, and/or optical recognition techniques and send indications of such user input using one or more communication units to computing device 60.

As described above, in some examples, computing device 60 may output graphical content for display at presence-sensitive display 64 that is coupled to computing device 60 by a system bus or other suitable communication channel. Computing device 60 may also output graphical content for display at one or more remote devices, such as projector 80, projector screen 82, mobile device 86, and visual display device 90. For instance, computing device 60 may execute one or more instructions to generate and/or modify graphical content in accordance with techniques of the present disclosure. Computing device 60 may output the data that includes the graphical content to a communication unit of computing device 60, such as communication unit 70. Communication unit 70 may send the data to one or more of the remote devices, such as projector 80, projector screen 82, mobile device 86, and/or visual display device 90. In this way, computing device 60 may output the graphical content for display at one or more of the remote devices. In some examples, one or more of the remote devices may output the graphical content at a presence-sensitive display that is included in and/or operatively coupled to the respective remote devices.

In some examples, computing device 60 may not output graphical content at presence-sensitive display 64 that is operatively coupled to computing device 60. In other examples, computing device 60 may output graphical content for display at both a presence-sensitive display 64 that is coupled to computing device 60 by communication channel 62A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 60 and output for display at presence-sensitive display 64 may be different than graphical content display output for display at one or more remote devices.

Computing device 60 may send and receive data using any suitable communication techniques. For example, computing device 60 may be operatively coupled to external network 74 using network link 72A. Each of the remote devices illustrated in FIG. 3 may be operatively coupled to network external network 74 by one of respective network links 72B, 72C, and 72D. External network 74 may include network hubs, network switches, network routers, etc., that are operatively inter-coupled thereby providing for the exchange of information between computing device 60 and the remote devices illustrated in FIG. 3. In some examples, network links 72A-72D may be Ethernet, ATM or other network connections. Such connections may be wireless and/or wired connections.

In some examples, computing device 60 may be operatively coupled to one or more of the remote devices included in FIG. 3 using direct device communication 78. Direct device communication 78 may include communications through which computing device 60 sends and receives data directly with a remote device, using wired or wireless communication. That is, in some examples of direct device communication 78, data sent by computing device 60 may not be forwarded by one or more additional devices before being received at the remote device, and vice-versa. Examples of direct device communication 78 may include Bluetooth, Near-Field Communication, Universal Serial Bus, WiFi, infrared, etc. One or more of the remote devices illustrated in FIG. 3 may be operatively coupled with computing device 60 by communication links 76A-76D. In some examples, communication links 76A-76D may be connections using Bluetooth, Near-Field Communication, Universal Serial Bus, infrared, etc. Such connections may be wireless and/or wired connections.

In accordance with techniques of the disclosure, computing device 60 may be operatively coupled to visual display device 90 using external network 74. Computing device 60 may output a graphical keyboard for display at presence-sensitive display 92. For instance, computing device 60 may send data that includes a representation of the graphical keyboard to communication unit 70. Communication unit 70 may send the data that includes the representation of the graphical keyboard to visual display device 90 using external network 74. Visual display device 90, in response to receiving the data using external network 74, may cause presence-sensitive display 92 to output the graphical keyboard. In response to a user performing a gesture at presence-sensitive display 92 (e.g., at a region of presence-sensitive display 92 that outputs the graphical keyboard), visual display device 90 may send an indication of the gesture to computing device 60 using external network 74. Communication unit 70 of may receive the indication of the gesture, and send the indication to computing device 60.

In response to receiving an indication of at least one gesture detected at a presence-sensitive input device, computing device 60 may model, in a first lattice, a plurality of character strings that each includes symbols of the first alphabet. The first lattice may indicate spatial probabilities of each of the plurality of character strings. In some examples, the spatial probabilities are based at least in part on the indication of the at least one gesture. Computing device 60 may determine for at least one of the plurality of character strings, using a second lattice that indicates probabilities of one or more words of a second language based at least in part on the spatial probabilities of the plurality of character strings, a probability that the at least one of the plurality of character strings corresponds to at least one word included in the second language. The at least one word may be represented by one or more symbols of a second alphabet corresponding to the second language. In response to determining that the at one probability satisfies a threshold, computing device 60 may output for display, the one or more symbols representing the at least one word. For instance, computing device 60 may send data representing the at least one word to communication unit 70. Communication unit 70 may send the data to visual display device 90 via external network 74. Visual display device 90 may cause presence-sensitive display 92 to output the at least one word represented by the data.

FIG. 4 is a conceptual diagram illustrating lattices, which a computing device may generate based on indications of user input to select characters of an alphabet in a first language and use to determine words of a second language, in accordance with techniques of the present disclosure. Techniques of the present disclosure are described for example purposes with respect to computing device 2 as illustrated in the examples of FIGS. 1-2. In some examples, as UI module 6 determines indications of user input, such as tap gestures, UI module 6 may generate touch events as previously described in FIGS. 1-2. A touch event may include a location component corresponding to a location of presence-sensitive display 4, a time component related to when presence-sensitive display 4 detected user input at the location, and/or an action component related to whether the touch event corresponds to a lift up or a push down at the location. UI module 6 may send the touch events to input lookup module 48, as illustrated in FIG. 2.

Input lookup module 48 may determine a neighbor key list based on one or more locations of presence-sensitive screen 4 indicated in the touch events. The neighbor key list may include a group of graphical keys that are proximal to the one or more locations indicated in the touch events. For example, input lookup module 48 may determine a group of keys that are within a threshold distance of the one or more locations indicated in the touch events. In other examples, input module 48 may determine a group of keys that correspond to the smallest distances between the keys and the locations indicated in the touch events. For example, input lookup module 48 may include in the neighbor key list, the two keys with the shortest distances to the one or more locations indicated in the touch events. In some examples, input lookup module 48 may determine the distance between a centroid of key and the one or more touch locations. In other examples, input module 48 may determine the distance from any suitable location of a key to the one or more touch locations.

Input lookup module 48, in some examples, determines a spatial model probability for each key in the neighbor key list. For example, the neighbor key list may include key information corresponding to the 'z' key and the 'x' key, in response to determining a touch event for tap location 20A of FIG. 1. Using the key information and spatial model 10, input lookup module 48 may determine a spatial model probability for the 'z' key. Similarly, lookup module 48 may determine a spatial model probability for the 'x' key. In the current example, lookup module 48 may determine the spatial model probability for the 'z' key is 0.64 and the spatial model probability for the 'x' key is 0.36. In some examples, input lookup module 48 may send the neighbor key list and corresponding spatial model probabilities for each of the keys included in the neighbor key list to builder module 50.

Builder module 50 may receive the neighbor key list and corresponding spatial model probabilities for each key in the neighbor key list. Builder module 50, generally, may build one or more lattices in accordance with techniques of the disclosure. For instance, as shown in FIG. 4, builder module 50 may generate character lattice 100. Character lattice 100 may model characters corresponding to each input gesture, e.g., one or more taps and/or continuous gestures. Builder module 50 may generate character lattice 100 as a directed acyclic graph with vertexes, such as vertexes 102A-102C and edges, such as edges 104A-104D.

As a user provides tap inputs, builder module 50 may incrementally receive neighbor key lists from input module 48 that indicate keys proximal to the tap inputs. Each vertex may be generated and correspond to a tap input. Each edge may correspond to a possible character corresponding to the tap input. For a first determined tap input, builder module 50 may generate one or more edges from a vertex 102A with index 0 to a vertex 102B with index 1. Each vertex may be associated with a different index, wherein the root vertex may be assigned an index value of 0. Builder module 50 may generate a respective edge from vertex 102A to vertex 102B for each key in the neighbor key list. For example, builder module 50 may generate edge 104A for key 'z' and edge 104B for key 'x'. Builder module 50 may also associate the spatial model probability (e.g., 0.64) for the 'z' key with edge 104A that corresponds to the 'z' key, such that the spatial model probability is the weight for edge 104A. Similarly, builder module 50 may associate the spatial model probability (e.g., 0.36) for the 'x' key with edge 104B that corresponds to the 'x' key. Thus, builder module 50 may determine spatial model probabilities of keys of the graphical keyboard that are proximal to a location of the tap input. In some examples, a key of the graphical keyboard may be proximal to the location of the tap input when the distance between a location of the key and the tap input satisfies a threshold. For instance, threshold may be satisfied if the distance between the location of the key and the tap input is less than a threshold. In one example, the distance may be a determined distance in a range of 0-100 millimeters. In some examples, the location of the key may be the centroid of the key. In other examples, the location of the key may be any location corresponding to the key. In some examples, a key of the graphical keyboard may be proximal to the location of the tap input when the number of pixels between a location of the key and the tap input satisfies a threshold. In one example, the number of pixels may be a determined number of pixels in a range of 0-1000.

As builder module 50 incrementally receives tap inputs, builder module 50 generates additional vertexes 102B, 102C, etc., and generates edges 104A-104D, etc. to the respective vertexes of character lattice 100. Each subsequent tap input may be modeled with a next incremental index value of a vertex. That is, builder module 50 generates edges from a vertex with index 0 to a vertex with index 1 for characters modeled based on a first tap input. Builder module 50 generates edges from a vertex with index 1 to a vertex with index 1 for characters modeled based on a second tap input, and so forth. In this way, as the user taps "zhonghuo" at graphical keyboard 16B, builder module 50 may generate edges for possible keys corresponding to the tap inputs. Thus, builder module 50 may generate edges in a third lattice that each correspond to the keys of the graphical keyboard that are proximal to the location of the tap input. Consequently, character lattice may indicate the respective probabilities of different keys that the user may possibly have tapped when providing tap inputs. A higher spatial model score for a key may indicate a higher probability that the user intended to select the key, while a lower spatial model score for a key may indicate a lower probability that the user intended to select the key.

Builder module 50 may also incrementally construct a token lattice 110, as shown in FIG. 4 as touch events are generated by UI module 6 in response to user inputs. Token lattice 110 may also be implemented as a directed acyclic graph with vertexes and edges as illustrated in FIG. 4. In some examples, token lattice 110 may include vertexes with the same vertex indexes as character lattice 100. For instance, vertex 112A may include the same index has vertex 102A, vertex 112B may include the same index as 102B, vertex 112C may include the same index as vertex 103C, etc.

Builder module 50 may also generate edges that correspond to candidate character strings. As previously described in FIG. 1, a candidate character string may represent a combination of characters that correspond to possible keys tapped by the user. Each candidate character string may correspond to a pronunciation representation, for example, a pinyin string that represents a Chinese character. In some examples, a candidate character string may be a group of characters comprising a semantic and/or phonetic unit such as a syllable, word, etc. In some examples, candidate character strings may be exact spellings of pronunciation representations, such as "zhong" and "guo".

Builder module 50 may select a group of one or more characters corresponding to edges of character lattice 100 to form a candidate character string and associate the candidate character string with an edge of token lattice 110. For instance, builder module 50 may associate candidate character string "zhong" with edge 114C. The index of the head vertex 112A of edge 114C may correspond to 0 and the index of tail vertex 112D may correspond to 5. That is, builder module 50 may determine the index of the tail vertex to be equal to n where n is the number of characters in the candidate string. For example, in FIG. 4, the candidate character string "zhong" includes 5 characters, therefore builder module 50 may determine the tail vertex of edge 114C is vertex 112D, which has an index of 5.

As illustrated in FIG. 4, builder module 50 may also generate edge 114A from vertex 112D to vertex 112E. Edge 114A may correspond to the candidate character string "guo". Builder module 50 may also generate edge 114B from vertex 112D to vertex 112E. Edge 114A may correspond to the candidate character string "huo". As further described below, builder module 50 may determine any number of candidate character strings from character lattice 100 and associate the respective candidate character strings with edges of token lattice 110.

Each of the edges of token lattice 110 may further include a weight. The weight of an edge in token lattice 110 may indicate the collective spatial model probability of the candidate character string associated with the edge. The collective spatial model probability may represent the combined weight associated with each edge in character lattice 100 that corresponds to a character in the candidate character string. For example, the collective spatial model probability for "zhong" (i.e., the weight for edge 114C) may be based on the weights of the edges in character lattice 100 corresponding to characters 'z', 'h', 'o', 'n', 'g'. In one example, builder module 50 may determine that the weight of edge 114C is equal to the following product: 0.64×0.78× 0.65×0.55×0.58=0.104. That is, builder module 50 may determining a group of characters included in a candidate character string of the plurality of candidate character strings, and determine spatial model probabilities of keys corresponding to characters included in the candidate character string. Based on the determinations, builder module 50 determine a collective spatial model probability of the candidate character string based at least in part on the spatial model probabilities of keys corresponds to characters included in the candidate character string. Builder module 50 may similarly determine weights for edges 114A, and 114B.

Builder module 50 may use a variety of techniques to determine the number of edges included in token lattice 110, the number of characters in each candidate character string of token lattice 110, and the start and end characters of a character string that are determined from character lattice 100. In some examples, builder module 50 may determine the number of edges (and therefore the number of candidate strings) included in token lattice 110 based on a threshold. For instance, builder module 50 may include a number of edges in token lattice 110 that is less than a threshold. In some examples, the number of edges included in token lattice 110 may be based on time window and/or keystroke quantity window. In this way, as additional characters are received and/or additional time passes from an initial input, the lifetime of an edge may decay and eventually builder module 50 may remove the edge from token lattice 110. In other examples, builder module 50 may remove an edge from token lattice 110 in response to determining a delimiter character or that one or more characters and/or words have been selected by a user.

In some examples, builder module 50 may determine the number of characters in each candidate character string associated with an edge of token lattice 110 based on one or more rules. In some examples, the one or more rules may be implemented in lexicon that includes different possible candidate character strings. The rules may indicate the probabilities of groups of candidate character strings based, e.g., the frequency with which characters follow other given characters, the language context in which the characters are input, etc., as further described herein below.

A lexicon may be represented by a range of data structures, such as an array, a list, and/or a tree. For instance, in some examples, computing device 2 may include a lexicon implemented in a trie data structure. A lexicon may include a listing of words and may include additional information about the listed words. A lexicon trie data structure may contain a plurality of nodes, and each node may represent a letter. The first node in a lexicon trie may be referred to as the entry node which may not correspond to a letter. In other examples, the entry node may correspond to a letter. Each node may include one or more branches to one or more child nodes. For instance, the entry node may have twenty-six child nodes, each corresponding to a letter of an alphabet (e.g., the English alphabet). The twenty-six child nodes may each have one or more branches that correspond to additional nodes. Each of the additional nodes may be associated with a character. A child node may include a probability that indicates the probability that the letter of the child node follows the letter of the parent node. The probability may be based on one or more word and/or character n-gram language models, the frequency with which the character of the child node occurs, etc. In this way, a path in the lexicon trie may include a chain of child nodes corresponding to a candidate character string. For example, a chain of child nodes originating from the entry node may include the characters 'z', 'h', 'o', 'n', 'g', where each child node includes one of the characters.

A subset of the nodes in a lexicon trie may each include a flag which indicates that the node is a terminal node. Each terminal node of a lexicon trie may indicate a complete candidate string. Therefore, the letters indicated by the nodes along a path of nodes from the entry node to a terminal node may spell out a candidate character string indicated by the terminal node. In some examples, the lexicon trie be based on a dictionary installed on computing device 2. In other examples, the lexicon trie may be based on multiple sources, which may be stored at computing device 2 or stored at one or more remote computing devices and are accessible to computing device 2 via one or more communication channels.

The dictionary may indicate a corpus of possible candidate character strings. For example, the dictionary may include pronunciation representations of characters and/or words of a second language (e.g., Chinese). That is, the dictionary may include pinyin strings, such as "zhong", "huo", "guo", etc. in example where the dictionary includes Chinese pinyin strings.

A node in the lexicon trie may include the flag to indicate a terminal token if the node is a child node in a path of nodes from the entry node, and the characters included in the ancestor nodes along the path comprise a string of characters of a word that is included in the dictionary. For example, a path of six nodes that includes [<entry>, 'z', 'h', 'o', 'n', 'g'] as respective values may include a flag indicating a terminal node in the sixth node that includes the letter 'g'. In this way, when traversing the lexicon trie from the entry node to the terminal, computing device 2 may determine the beginning and end of the candidate character string.

In some examples, in some examples, nodes of the lexicon trie may include probabilities of the characters included in the nodes based on language model frequency information such as n-gram language models. An n-gram language model may provide a probability distribution for an item x, (letter or word) in a contiguous sequence of items based on the previous items in the sequence (i.e., $P(x_i|x_{i-(n-1)}, \ldots, x_{i-1})$). For instance, a bigram language model (an n-gram model where n=2), may provide a probability that the letter "o" follows the sequence "zh". In some examples, a lexicon trie may include integrated language model frequency information. For instance, each node of the lexicon trie may include a representation of a letter and a probability value.

Builder module 50, in some examples, may determine the start an end characters of a candidate character string (e.g., a group of characters included in character lattice 100) based on a terminal flag included in a terminal node of the lexicon trie. For instance, as builder module 50 incrementally builds character lattice 100, builder module 50 may store state information about possible candidate character strings, such as the characters included in each of the candidate character strings. Builder module 50 may compare the character strings incrementally to nodes of the lexicon trie. If builder module 50 determines that a character corresponds to a terminal node included in a path of the lexicon trie, builder module 50 may determine that the characters corresponding to the nodes in the path are a candidate character string included in a dictionary on which the lexicon is constructed. For example, builder module 50 may receive a touch event that indicates a location proximal to a key corresponding to the character 'g'. Builder module 50 may currently include state information about a candidate string "zhon" and therefore determine a path in the lexicon trie with nodes that correspond to "zhong". The node corresponding to "g" may include a flag to indicate that it is a terminal node. In response to determining the flag indicating the terminal node, builder module 50 may generate edge 114C in token lattice 110 that corresponds to "zhong".

In some examples, builder module 50, in response to determining a terminal node, may determine that subsequent tap inputs may correspond to characters of a different candidate character string. For instance, builder module 50 may determine based on the terminal node 'g', that "zhong" is a candidate string included in a dictionary. The next tap input, may therefore correspond to the start of a different candidate character string. For example, the next two character corresponding to possible keys, may be 'h' and 'g' as indicated in character lattice 100 by edges from the vertex with index 5 to the vertex with index 6. In this way, builder module 50 may maintain state of different candidate strings that begin with the characters 'h' and 'g' respectively. As characters corresponding to subsequent tap inputs are determined, builder module 50 may, for example, compare candidate strings "huo" and "guo" to the lexicon trie. Upon determining terminal nodes for each of "huo" and "guo" in the lexicon trie, builder module 50 may add edge 114A to token lattice 110 for "guo" and edge 114B for "huo". In this way, builder module 50 may determine character and word boundaries between groups of characters in character lattice 100, and add corresponding candidate character strings to token lattice 110.

Builder module 50 may in some examples, select one or more candidate character strings based on the lexicon trie even though the nodes corresponding to the last letters of the character strings are not terminal nodes. For instance, builder module 50 may determine the collective probability of a character string corresponding to multiple nodes in a path of the lexicon trie. The collective probability may be based on probabilities associated with each individual node along the given path. A probability associated with an individual node, as indicated above, may be based on one or more word and/or character n-gram language models, the frequency with which the character of the child node occurs, etc. Builder module 50 may determine one or more candidate character strings based on the collective probabilities of the one or more candidate character strings. For instance, if the collective probability of a candidate character string satisfies a threshold (e.g., the collective probability is greater than the threshold), builder module 50 may add an edge to token lattice 110 that corresponds to the candidate character string.

While builder module 50 may use a lexicon trie, as illustrated in the previous example, to identify start and end characters of candidate character strings based on characters included in character lattice 100, builder module 50 may also use other techniques to determine start and end characters. For example, builder module 50 may use length thresholds when determining start and end characters. Length thresholds may be based on statistical information that indicate probable lengths of candidate character strings. In other examples, length thresholds may be user-defined values. In the Chinese language, pinyin values may most commonly be of character lengths between a lower bound threshold and an upper bound threshold. As one, non-limiting example the lower bound threshold may be 2 characters and the upper bound threshold may be 4 characters. In response to determine a sequence of characters that may correspond to keys proximal to tap inputs, builder module 50 may add edges to word lattice 110 that correspond to candidate character strings of lengths 2, 3, 4, and 5. For instance, builder module 50 may add edges for candidate character strings "zh", "zho", "zhon", and "zhong", even though one or more of the candidate character strings may not be included in a dictionary and/or modeled in a lexicon trie.

In one alternative example, builder module 110 may build an intermediate token lattice that models candidate character strings comprising misspellings of candidate character strings that are included in a dictionary. That is, builder module 110 may determine an out-of-vocabulary candidate character string and model a corresponding candidate character string in the dictionary that is similar to the out-of-vocabulary candidate character string in token lattice 110. For instance, builder module 110 may determine a candidate character string "zhomv", which may also be a misspelling of a pronunciation representation "zhong". In some examples, builder module 50 may generate edges for candidate character strings in the intermediate token lattice that comprise both misspellings of pronunciation representations. In some examples, builder module 110 may probabilistically determine the degree of similarity between candidate character string corresponding to the edge in the intermediate lattice (e.g., a misspelling or out-of-vocabulary candidate character string) and one or more candidate character strings in a dictionary. In some examples, builder module 110 may determine the degree of similarity using a lexicon trie or one or more Jaccard coefficients. If the degree of similarity between the misspelling and the candidate character string in the dictionary satisfies a threshold (e.g., degree of similarity is greater than a threshold), builder module 110 may include an edge in token lattice 110 corresponding to the candidate character string included in the dictionary.

As computing device 2 receives indications of user input, builder module 50 may incrementally build word lattice 120. Builder module 50 may generate an edge that is associated with a single and/or multiple candidate character strings. That is, candidate character strings modeled on edges of token lattice 110 may correspond to Chinese pinyin strings, and edges on word lattice 120 may correspond to a single or combinations of Chinese pinyin strings. In some examples, a combination of one or more candidate character strings may correspond to one or more characters and/or words of a second language. For instance, a combination of one or more Chinese pinyin strings may comprise a Chinese word or Chinese phrase that includes multiple words. As one example, the pinging string "zhongguo" may be a representation for the Chinese word 中国 (i.e., "China"). As indicated throughout the description, although Chinese is illustrated as one non-limiting example of the second language, techniques of the disclosure may be generally applicable to any language.

In some examples, builder module 50 may create an edge in word lattice 120 that corresponds to one or more character, words or multi-word phrases of a second language. To select the one or more character, words or multi-word phrases of a second language to model in word lattice 120, builder module 50 may use a trie data structure. The trie data structure may be implemented as a tree with multiple nodes. Each node may correspond to a candidate character string (e.g., a pinyin string in the case of Chinese). For example, the trie data structure may include an empty root node. The root node may include a child node that corresponds to candidate character string 'zhong'. In addition, the node for 'zhong' may be associated with a character, word, or multi-word phrase of the second language (e.g., Chinese) that corresponds to the candidate character string. For instance, the child node corresponding to candidate character string 'zhong' may be associated with the character 中 of the Chinese language. The child node corresponding to 'zhong' may further include child nodes that correspond respectively to 'huo' and 'guo'. Each of the respective child nodes may be associated with 国 and 活.

To generate edges in word lattice 120, builder module 50 may create edges in word lattice 120 that correspond to one or more candidate character strings of word lattice 110. For instance, builder module 50 may traverse word lattice 110 and select the candidate character string 'zhong' corresponding to edge 114C. Builder module 50 may create an edge 124A in word lattice 120 that corresponds to the candidate character string 'zhong'. Builder module 50 may further associate the character 中 with edge 124A because character 中 is associated with the node in the trie that corresponds to the candidate character string 'zhong'. As further described below the language model probability included in the weight for an edge (e.g., 124B), is based on the character 中 and the candidate character string 'zhong'. The index values of the vertexes for edge 124A in word lattice 120 may correspond to the same start and end vertexes of edge 114C in token lattice 110. Builder module 50 may generate edges 124D and 124E in a similar matter.

In some examples, builder module 50 may generate an edge 124B that corresponds to a combination characters, words, or multiple-word phrases based on candidate character strings that are modeled in word lattice 110. For instance, builder module 50 may traverse the trie and determine a path through multiple nodes that corresponds respectively to different candidate character strings modeled in word lattice 110. For instance, builder module 50 may select 'zhong' corresponding to edge 114C and 'guo' corresponding to edge 114A from word lattice 110. Builder module 110 may traverse from the root node to a first child node corresponding to 'zhong' and further traverse to a second child node corresponding to 'guo' in the trie. In some examples, the second child node corresponding to 'guo' may be a terminal node. The terminal node may indicate that 'guo' is the last candidate character string in a group of candidate character strings, e.g., 'zhong' 'guo', which corresponds to 'zhongguo.' As shown in FIG. 4, builder module 120 generates an edge 124B that corresponds to the combination of candidate character strings 'zhongguo' by associating 中国 with the edge. Builder module 120 may similarly generate edge 124C.

As can be seen from FIG. 4, builder module 120 may determine any number of edges for word lattice 120 that are based on candidate character strings corresponding to edges of word lattice 110. For instance, if 'zhongguo' corresponds to multiple different characters, words, or multi-word phrases in Chinese, builder module 50 may generate edges for one or more of the possible combinations. For instance 'zhong' may correspond to '重' and '仲' in the Chinese language which may each be pronounced differently. In the trie, there may be separate nodes corresponding to {zhong, 重} and {zhong, 中}. Each of the separate nodes may each have two child nodes corresponding to {guo, 国} and {huo, 活}. Consequently, when builder module 50 traverses the trie, builder module 50 may generate separate edges in word lattice 120 corresponding to, e.g., {zhongguo, 重国}, {zhonghuo, 重活}, {zhongguo, 仲国}, and {zhonghuo, 中活}. In this way, builder module 50 may model multiple different combinations of candidate character strings corresponding to different characters/words/multi-word phrases of the second language on edges in word lattice 120. Furthermore, builder module 120 may determine any number of combinations of candidate character strings (e.g., 'zhong' and 'guo') from token lattice 110 that correspond to single edges in word lattice 120 (e.g., 'zhongguo').

In some examples, builder module 50 may determine a weight for each edge of word lattice 120, where each edge of word lattice 120 corresponds to a combination of one or more candidate character strings. As shown in FIG. 4, edge 124A corresponds to candidate character string "zhong", edge 124B corresponds to candidate character string "zhongguo", and edge 124C corresponds to candidate character string "zhonghuo", edge 124D corresponds to "guo", and edge 124E corresponds to "huo". In one example, builder module 50 may determine the start and end vertexes (122A and 122B) of edge 124A based on the start and end vertexes (e.g., 112A and 112D) of the edge (e.g., 114C) in token lattice 110 that corresponds to the candidate character string modeled on edge 124A. If multiple candidate character strings are modeled on a single edge in word lattice 120, builder module 50 may determine the index of the starting vertex 122A in word lattice 120 to be the index of the starting vertex 112A of the edge in token lattice 110 that corresponds to the first candidate character string included in the multiple candidate character strings. The index of the ending vertex 122C in word lattice 120 may equal to the ending index 112E of the edge in token lattice 110 that corresponds to the last candidate character string in the multiple candidate character strings. For instance, as shown in FIG. 4, the index of the starting vertex for edge 124B is equal to the index of the starting vertex for edge 114C and the index of the ending vertex for edge 124B is equal to the index of the ending vertex for edge 114A.

The weight of an edge in word lattice 120 may be based on the collective total weight from word lattice 110 of the group of one or more candidate character strings that correspond to the edge. The weight of an edge in word lattice 120 may be based on a language model score. In some examples, the weight of the edge may be based on the collective total weight from token lattice 110 and the language model score.

As shown in FIG. 4, edge 124C may be based on the collective total weight for "zhonghuo" (e.g., a spatial model score) and a language model score. The collective total weight may be equal to 0.104×0.308, which may indicate the overall spatial probability of the keys corresponding to the characters in "zhonghuo". Builder module 50 may also determine a language model probability (or "language model score") for edge 124C. In some examples, the language model probability may indicate the probability of a group of one or more candidate character strings that include characters of an alphabet of a first language, given a word in a second language. For instance, the language model probability for edge 124C may indicate the probability of "zhonghuo" given the Chinese word 中活. In other words, builder module 50 may determine a probability that, given the Chinese word "中活" ("zhonghuo") is the word intended by the user to be inputted, the user inputted the candidate string "zhonghuo", which includes two candidate character strings, "zhong" and "huo". That is, the language model probability of edge 124C may indicate the probability that the Chinese word '中活 124C may correspond to the probability that "中活" is pronounced 'zhonghuo'. More generally, the language model probability of edge 124C may indicate the probability that a character, word, or phrase of a second language, is pronounced according to a group of one or more candidate character strings. In some examples, the language model probability may be represented by the following:

$$P(t|s) = \frac{P(s|t)P(t)}{P(s)} \quad (1)$$

In equation 1, s may be the group of one or more candidate character strings and t may be one or more words included in a language model that is based on a dictionary of words and/or phrases of the second language. In this way, the language model score for edge 124C may be represented by:

$$P(t|s) = \frac{P(\text{'zhonghou'} | \text{'中活'})P(\text{'中活'})}{P(\text{'zhonghuo'})} \quad (2)$$

In some examples, builder module 50 may use language model 12 to determine the language model probability. Language model 12 may include a group of words within a language vocabulary, e.g., groups of Chinese words within a Chinese vocabulary. In some examples, language model 12 may be based on and/or include a set of words in a dictionary stored at computing device 2 or a remote computing device that is accessible by computing device 2. Language model 12 may indicate a probability of each respective word based on the frequency with which the word occurs in a given language context. Language model 12 may implement one or more n-gram language models. An n-gram language model may provide a probability distribution for an item $x_i$ (letter, word, punctuation character or other delimiter) in a contiguous sequence of items based on the previous items in the sequence (i.e., $P(x_i|x_{i-(n-1)}, \ldots, x_{i-1})$).

Builder module 50 may determine weights for each of edges 124A-124C. As previously described above, builder module 50 may incrementally construct lattices 100, 110, and 120 as computing device 2 receives indications of user input. As the lattices are constructed, decoding module 52 may periodically and/or continuously determine the edges of word lattice 120 that are associated with the highest weights. In other examples, decoding module 52 may determine, based on incremental determinations of user inputs, edges of word lattice 120 that are associated with the highest weights. That is, decoding module 52 may determine a threshold number of edges that have the highest weights.

For instance, decoding module 52 may search the edge weights of word lattice 120 using a Viterbi algorithm, other similar dynamic programming techniques, or generally, any suitable searching techniques for searching the word lattice. For instance, decoding module 52 may search for paths of edges through word lattice 120 that include edges with the n highest collective total weights. For instance, decoding module 52 may initially determine which edge from vertex 122A to 122B has the highest weight. Builder module 50 may further determine which edge from vertex 122B to 122C has the highest weight.

Decoding module 52 may continue to search for the highest weights along possible edges of word lattice 120. In some examples, decoding module 52 may determine collective total weights for a threshold number of paths. For instance, builder module 50 may determine collective total weights for 3 paths, where the threshold number of paths is, e.g., 3. In some examples, decoding module 52 may determine maximum number of edges per path based on threshold number of edges. That is, decoding module 52 may determine collective total weights for paths having a maximum number of edges equal to, e.g., 2. In such examples, decoding module 52 may determine the collective total weight for paths that that include two edges. To determine a collective total weight for edges 124A and 124D, decoding module 52 may determine a product of the weights for edges 124A and 124D.

Upon determining a group of one or more characters, words or phrases of the second language indicated in word lattice 120, computing device 2 may output the characters, words, or phrase for display. As one example, user interface 14 may include two word suggestion regions 18A and 18B. Therefore, decoding module 52 may determine the threshold number of edges may be equal to two. Consequently, decoding module 52 may determine the respective one or more words associated with the edges having the two highest weights. For instance, in FIG. 4, decoding module 52 may determine that the weights for edges 124B and 124C have the highest two weights. In response to determining edges 124B and 124C, decoding module 52 may send data representing the words "中国" and "重活" to UI module 6. UI module 6 may display the words "中国" and "重活" in word suggestion regions 18A and 18B. In other examples, UI module 6 may display the word associated with the edge having the highest weight in edit region 16A. In still other examples, computing device 2 may receive an indication of the user performing a tap gesture at tap location 20I, which may in turn cause presence-sensitive display 4 to output the word "中国" in user interface 14 with characters 22A and 22B. In this way, although tap locations 20A-20H may appear to select keys proximal to "zhonghuo", techniques of the disclosure using lattices 100, 110, and 120 may cause presence-sensitive display 4 to output "中国" (e.g., "zhongguo"). Consequently, techniques of the display may provide for greater error resilience to user inputs when entering pronunciation representations that include characters of an alphabet of a first language in order to output characters and/or words of a second language.

Figure 5:
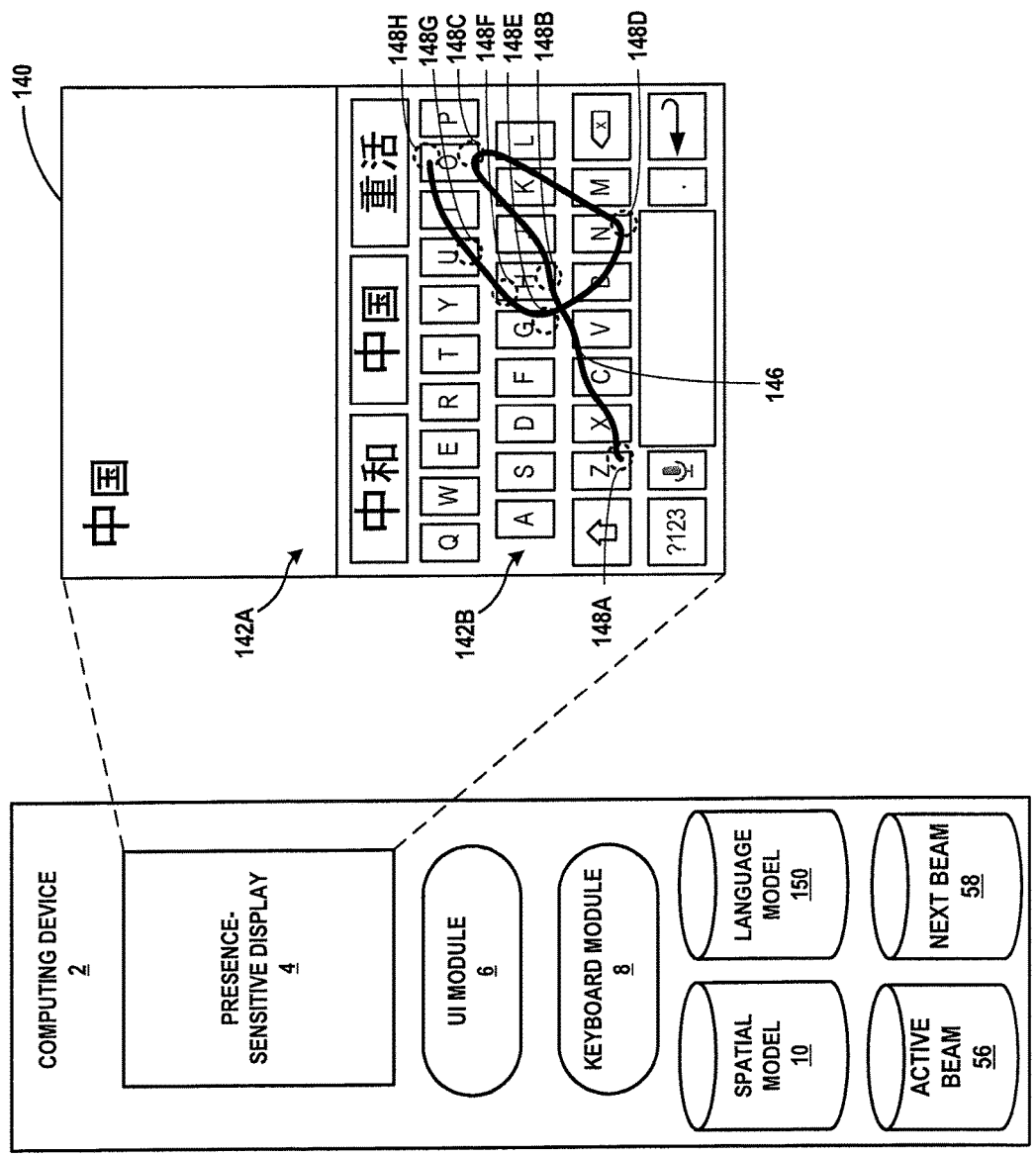
FIG. 5 is a block diagram illustrating further details of one example of a computing device shown in FIG. 1 determining one or more characters and/or words of a second language based at least in part on a continuous gesture to select characters included in an alphabet of a first language, in accordance with one or more techniques of the present disclosure.

FIG. 5 is a block diagram illustrating further details of one example of a computing device shown in FIG. 1 determining one or more characters and/or words of a second language based at least in part on a continuous gesture to select characters included in an alphabet of a first language, in accordance with one or more techniques of the present disclosure. As shown in the conceptual example of FIG. 5, computing device 2 may include presence-sensitive display 4, UI module 6, keyboard module 8, spatial model 10, language module 12, active beam 56, and next beam 58. GUI 140 may include graphical keyboard 142B which may include QWERTY keyboard.

As shown in the example of FIG. 1, a user may desire to enter one or more candidate character strings (e.g., pronunciation representations, such as Chinese pinyin strings) into computing device 2 by performing a continuous gesture at graphical keyboard 142B. While the user performs a continuous gesture, computing device 2 may detect a gesture path 146 that corresponds to the continuous gesture. In some examples, a continuous gesture may refer to a user performing a gesture with an input unit (e.g., finger, stylus, etc.) that is detected at presence-sensitive display 4 in which the input unit traverses a gesture path through different locations. The gesture may be detected at presence-sensitive display 4 while the input unit remains detected at presence-sensitive display 4. When the input unit is no longer detected at presence-sensitive display 4, computing device 2 may determine the gesture has terminated. In this way, a user may perform a continuous gesture that traverses multiple keys of a graphical keyboard to input text. In the example of FIG. 5, computing device 2 is shown as having detected gesture path 146. Although illustrated in FIG. 5, gesture path 146 and/or alignment points 148A-148H may not be visible during the performance of the techniques described herein. An alignment point may be a point along a gesture path that may indicate a key of the plurality of keys included in a graphical keyboard. An alignment point may include one or more coordinates corresponding to the determined position of the alignment point. For instance, an alignment point may include Cartesian coordinates corresponding to a point in a graphical user interface. To determine that key of a graphical keyboard is associated with a gesture path, computing device 2 may determine features of a group of alignment points, such as a length of a segment of the gesture, wherein the segment comprises a path traversed by the gesture at the presence-sensitive display; a direction of the segment of the gesture; a curvature of the segment of the gesture; a local speed that represents a rate at which the segment of the gesture was detected; a global speed that represents a rate at which the gesture was detected, etc. For instance, as an input unit slows near a key and changes direction, the curvature of the gesture path may be high. The features of the gesture path as determined based on the alignment points corresponding to the gesture may indicate user intended to select the key.

Keyboard module 8 may determine candidate character strings based at least in part on a group of keys in accordance with the techniques of the disclosure as described in FIG. 5. Rather than generating a character lattice, e.g., character lattice 100, keyboard module 8 may incrementally determine candidate character strings based on one or more continuous gestures and associate such string with edges in token lattice 110. For instance, the user may perform a continuous gesture at graphical keyboard 148A, and in response to determining that the candidate character string "zhong" corresponds to the continuous gesture, keyboard module 8 may associate "zhong" with an edge of token lattice 110. Keyboard module 8 may incrementally determine characters and or words based on word lattice 120 as previously described in FIG. 4. Techniques are now further described with reference to FIG. 5.

To determine one or more candidate strings based on a continuous gesture input, keyboard module 8 may use language model 150. Language model 150 may include a lexicon. In some examples, a lexicon may include a listing of words and may include additional information about the listed words. A lexicon may be represented by one or more data structures, such as by one or more of an array, a list, a tree, or other data structures. For example, language model 150 may include a lexicon stored in a trie data structure. A lexicon trie data structure may include a plurality of nodes. Each node of the lexicon trie may represent a letter. The first node in a lexicon trie may be considered an entry node, which may not correspond to a letter. In other examples, the entry node may correspond to a letter. Each node may have one or more child nodes. For instance, the entry node may have twenty-six child nodes, each corresponding to a letter of the English alphabet.

A subset of the nodes in a lexicon trie may each include a flag which indicates that the node is a terminal node. Each terminal node of a lexicon trie may indicate a candidate character string included in the lexicon. For instance, the lexicon may be based on a dictionary of valid candidate character strings (e.g., Chinese pinyin strings). The letters indicated by the nodes along a path of nodes from the entry node to a terminal node may spell out a candidate character string indicated by the terminal node. In some examples, language model 150 may be a default dictionary installed on computing device 2. In certain examples, language model 150 may include a group of predefined phrases. In other examples, language model 150 may include multiple sources of lexicons, which may be stored at computing device 2 or stored at one or more remote computing devices that are accessible to computing device 2 via one or more communication channels.

In response to initially detecting a portion of gesture path 146, keyboard module 8 may determine alignment point 148A along gesture path 146 that is traversed by the gesture performed by the user. Responsive to detecting the portion of gesture path 146 corresponding to alignment point 148A, keyboard module 8 may create a word-level token and push the word-level token into active beam 56. The contents on active beam 56 at this time may be represented by Table 1 below.

TABLE 1

| Index | Parent Index | Letter Key of Current Node | Letter Chain | Cost Value |
| --- | --- | --- | --- | --- |
| 0 | — | — | — | 0 |

As shown in FIG. 5, computing device 2 may include active beam 56. Active beam 56, in some examples, is configured to store one or more tokens (e.g., one or more word-level tokens) generated by keyboard module 8. Active beam 56 may be included within storage devices 48. Computing device 2 may also include next beam 58. Next beam 58, in some examples, is configured to store one or more tokens generated by gesture module 8 (e.g., one or more word-level tokens). Next beam 56 may also be included within storage devices 48.

In Table 1, each row represents an individual word-level token, the index column represents a unique identifier for each word-level token, the parent index column represents the index value of the word-level token to which the listed word-level token is a child, the letter key of the current node column represent the letter key represented by the current node of the word-level token, the letter chain column represents all of the letter keys represented by the nodes from the entry node to the current node of the word-level token, and the cost value column represent the cost value of the word-level token. As shown in Table 1, the created word-level token has an index of 0 (i.e., word-level token$_0$), no parent index, no letter key of the current node, no letter chain, and a cost value of zero.

To determine the text indicated by the gesture, keyboard module 8 may create a copy of each word-level token on its child nodes. That is each word-level token may be advanced to the next level of child nodes in the lexicon trie of language model 150. In some examples, an entry node may have 26 child nodes (one for each letter of the English alphabet). For simplicity, in the example of FIG. 5, the entry node has only two child nodes on the letters "Z" and "X". Therefore, keyboard module 8 may create a copy of the word-level token with index 0 on child node "Z" (i.e., word-level token$_1$) and child node "X" (i.e., word-level token$_2$). For each created word-level token copy, keyboard module 8 may determine a cost value. That is, computing device 2 may determine respective cost values for each of at least two keys of the plurality of keys. The respective cost values may each represent probabilities that an alignment point of the group of alignment points indicates a key of the plurality of keys. The cost value may be based on a language model probability that indicates the probability of the letter chain given a letter key of the current node. The language model probability may be based on one or more character, word and/or phrase level n-grams that indicate probabilities of a character, word and/or phrase, given one or more characters, words and/or phrases. The cost value may be based at least in part a spatial model probability that the gesture corresponds to the key of the letter of the current node. In some examples, the cost value is based at least in part on a language model probability and a spatial model probability.

Keyboard module 8 may push each word-level token copy to next beam 58, the contents of which may be represented by Table 2 below.

TABLE 2

| Index | Parent Index | Letter Key of Current Node | Letter Chain | Cost Value |
|---|---|---|---|---|
| 1 | 0 | Z | Z | CV1 |
| 2 | 0 | X | X | CV2 |

The entries shown in Table 2 are similar in format to the entry shown in Table 1. In Table 2, word-level token$_1$ has cost value CV1 and word-level token$_2$ has cost value CV2. After creating the word-level token copies, keyboard module 8 may determine that word-level token$_0$ is not a terminal node, and may discard word-level token$_0$. Keyboard module 8 may subsequently determine whether active beam 56 is empty (i.e., contains no tokens). In response to determining that active beam 56 is empty, computing device 2 may copy the contents of next beam 58 to active beam 56 and discard the contents of next beam 56A.

Keyboard module 8 may further determine alignment points 148B-148E along gesture path 146. Keyboard module 8 may, for each word-level token in active beam 56, incrementally create a copy on each child node, as keyboard module 8 determine each of alignment points 148B-148E, which may correspond to one or more keys of graphical keyboard 142B. In the example of FIG. 5 upon determining alignment point 148B, word-level token' and word-level token each have child nodes with letter keys "G" and "H". For each created word-level token copy, computing device 2 may determine a cost value as described above. Computing device 2 may push each word-level token copy in to next beam 58, the contents of which may be represented by Table 3 below.

TABLE 3

| Index | Parent Index | Letter Key of Current Node | Letter Chain | Cost Value |
|---|---|---|---|---|
| 3 | 1 | G | ZHONG | CV3 |
| 4 | 1 | H | ZHONH | CV4 |
| 5 | 2 | G | XHONG | CV5 |
| 6 | 2 | H | XHONH | CV6 |

The entries shown in Table 3 are similar in format to the entries shown in Table 1 and Table 2. In Table 3, the cost value for each word-level token includes the cost value for the previous letters and the cost value for the current letter. Computing device 2 may determine which, if any, of the word-level tokens are on terminal nodes. For instance, computing device 2 may determine that word-level token$_3$ is on a terminal node because its string of predicted characters (i.e., its letter chain) "ZHONG" represents a candidate word included in the lexicon (e.g., in a pinyin string dictionary).

In response to determining that a word-level token is on a terminal node, keyboard module 8 may create an edge in token lattice 110 that corresponds to the letter chain, e.g., a candidate character string. In some examples, keyboard module 8 may determine the spatial model of character string and associate the spatial model as the weight of the edge in token lattice 110 that corresponds to the candidate character string. In this way, as keyboard module 8 determines letter changes that correspond to candidate character strings (e.g., Chinese pinyin strings), keyboard module 8 may include edges in token lattice 22 that are further used by keyboard module 8 with word lattice 120 to determine characters and/or words in a second language, as described in FIG. 4.

In addition, computing device 2 may generate, in response to determining that the word-level token is on a terminal node, a next-word token that indicates that a next selected key of the plurality of keys is a prefix of a second word-level token. The next-word token may be considered an entry node of the second word-level token. Computing device 2 may push the next-word token (i.e., the entry node of the second word-level token) into active beam 56, the contents of which may be represented by Table 4 below.

TABLE 4

| Index | Parent Index | Letter Key of Current Node | Letter Chain | Cost Value |
|---|---|---|---|---|
| 3 | 1 | G | ZHONG | CV3 |
| 4 | 1 | H | ZHONH | CV4 |
| 5 | 2 | G | XHONG | CV5 |
| 6 | 2 | H | XHONH | CV6 |
| 7 | 3 | — | — | 0 |

The entries shown in Table 4 are similar in format to the entries shown in Tables 1, 2, and 3. As shown in Table 4, the created word-level token corresponding to the next-word token has an index of 7 (i.e., word-level token), a parent index of 3 (i.e., corresponding to word-level token$_3$), no letter key of the current node, no letter chain, and a cost value of zero. As illustrated in Table 4, the word-level token with index 7 may store the parent index of the previous candidate character string, e.g., "zhong", as state information, such that keyboard module 8 may determine the candidate character string associated with the letter chain of the parent index. In this way, keyboard module 8 may determine groups of one or more associated letter chains, which may correspond to words and/or groups of words in the lexicon.

Keyboard module 8 may maintain the state information along with determining terminal nodes to identify word boundaries when receiving a continuous gesture that corresponds to multiple candidate character strings. That is, keyboard module 8 may determine a transition probability between "zhong" and a subsequent candidate character string corresponding to the index of 7. Keyboard module 8 may store the transition probability as a part of the state information for the next-word token corresponding to index 7. The transition probability may be based on one or more n-gram character and/or word language models that indicate probabilities of boundaries between candidate character strings and which may be based on a dictionary of candidate character strings. In one example, keyboard module 8 may determine a plurality of characters, "zhonghuo" in response to receiving an indication of at least one gesture detected at a presence-sensitive input device. Keyboard module 8 may determine, based on a language model, at least one boundary between the plurality of characters, e.g., between "zhong" and "huo", which represent different candidate character strings. The at least one boundary may indicate a first group of characters in the plurality of characters that correspond to a first candidate character string "zhong" and a second group of characters in the plurality of characters that correspond to a second candidate character string "huo". As further described below in the example of FIG. 5, keyboard module 8 may generate a first edge in the token lattice that is associated with the first candidate character string "zhong", wherein the first edge originates from a first vertex 112A and ends at a second vertex 112D. Keyboard module 8 may generate a second edge 114B in the token lattice that is associated with the second candidate character string "huo", wherein the second edge originates from the second vertex 112D and ends at a third vertex 112D. In some examples, keyboard module 8 may use the transition probability to determine whether to concatenate the character strings "zhong" and "huo" as "zhonghuo" on an edge of word lattice 120.

In the example of FIG. 5, keyboard module 8 may further determine alignment points 148F-148H along gesture path 146. Keyboard module 8 may, for each word-level token in active beam 56, create a copy on each child node. In the example of FIG. 5, token$_3$ through token each have child nodes with letter keys "G" and "H", respectively. In addition, token$_7$ may be considered an entry node for a word-level token with an index of 7. As such, keyboard module 8 may also create a copy at a child node of word-level token$_7$. For each created word-level token copy, keyboard module 8 may determine a cost value as described above. Keyboard module 8 may push each word-level token copy into next beam 58, the contents of which may be represented by Table 5 below.

TABLE 5

| Index | Parent Index | Letter Key of Current Node | Letter Chain | Cost Value |
|---|---|---|---|---|
| 8 | 3 | O | ZHONGGUO | CV8 |
| 9 | 3 | O | ZHONHHUO | CV9 |
| 10 | 4 | O | XHONGGUO | CV10 |
| 11 | 4 | O | XHONGHUO | CV11 |
| 12 | 7 | O | GUO | CV12 |
| 13 | 7 | O | HUO | CV13 |
| n | m | x | <letter chain> | CVn |

The entries shown in Table 5 are similar in format to the entries shown in Tables 1-4. In Table 5, the cost value for each word-level token includes the cost value for the previous letters and the cost value for the current letter. As such, computing device 2 may determine one or more word-level tokens based at least in part on a word-level token that represents a candidate word included in the lexicon and a predicted selection of a character key. In such a way, keyboard module 8 may determine word-level tokens in response to receiving an indication of a continuous gesture to select a group of keys included in a graphical keyboard. Keyboard module 8 may continue to incrementally determine the one or more word-level tokens as keyboard module 8 receives further indications of the gesture, thereby enabling a user to provide a single gesture to select a group of keys of a word or phrase.

As described above, keyboard module 8 may, upon determining a terminal node, generate an edge on word-lattice 112 that includes the corresponding letter chain (e.g., candidate character string) of the terminal node. In other examples, keyboard module 8 may determine letter chains to include as candidate character strings in token lattice 110 based on cost values. That is, keyboard module 8 may determine cost values that satisfy a threshold. For instance, keyboard module 8 may determine cost values that are greater than a threshold and generate edges in token lattice 110 for the letter chains respectively associated with the cost values. Thus, in some examples, in response to determining that the cost value of a combination of keys (e.g., a cost value associated with a letter chain that represents a candidate character string) satisfies a threshold, associating, by the computing device, a candidate character string with an edge of the word lattice, wherein the character string includes characters associated with the combination of keys. In some examples, the difference between the index of the starting vertex and index of the ending vertex may be equal to the number of characters in the candidate character string. For instance, if the determined candidate character string is "zhong" the index of the starting vertex may be zero and the index of the ending vertex may be 5. If multiple candidate character strings are determined from a single string based on boundary, e.g., "zhong", "huo", the start vertex of the second candidate character string may begin at a vertex with index 5 and end at a vertex with index 8.

Figure 6A:
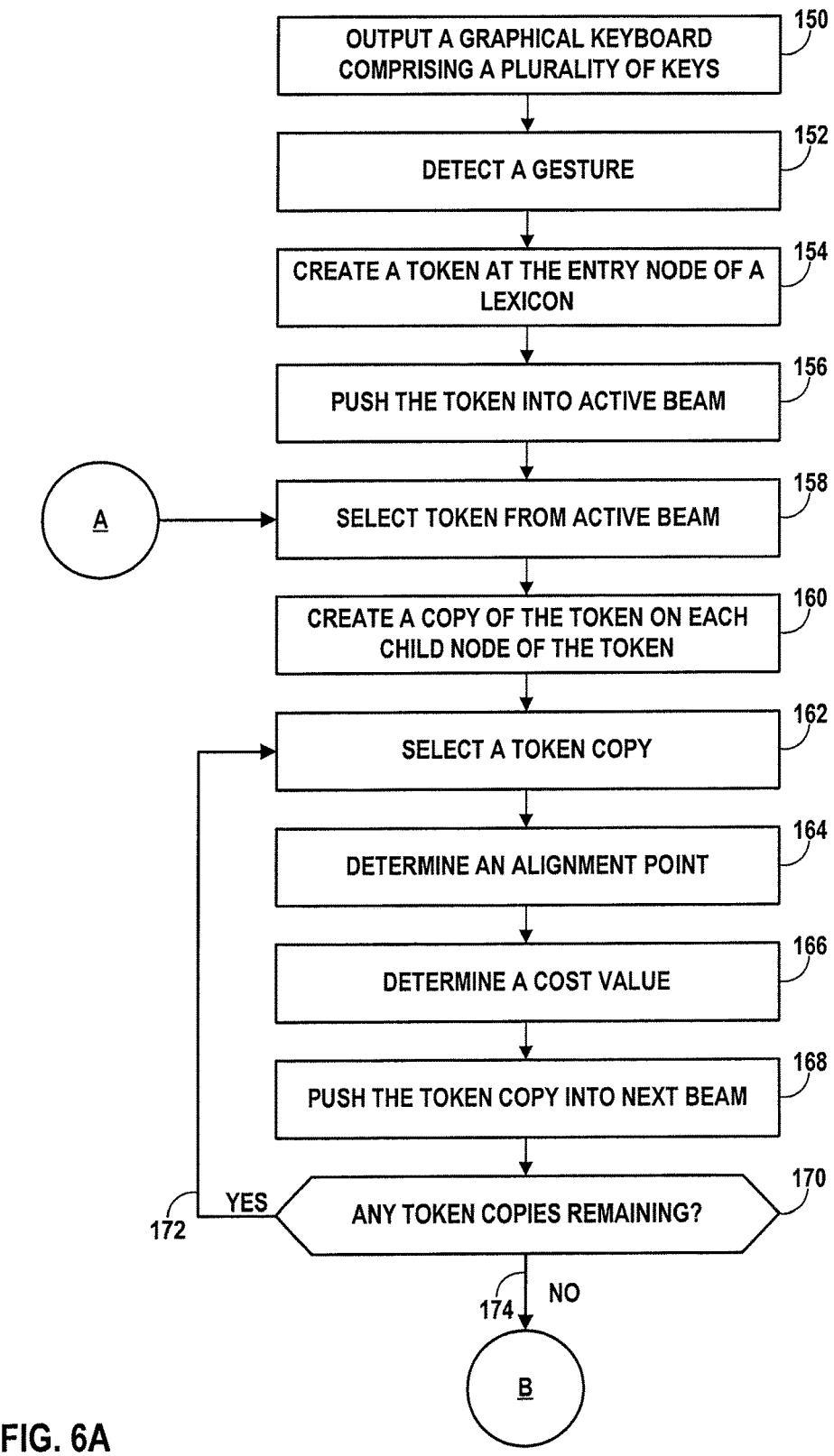
FIGS. 6A-6B are flow diagrams illustrating example operations of a computing device to determine a word and/or phrase from a gesture, in accordance with one or more techniques of the present disclosure.
Figure 6B:
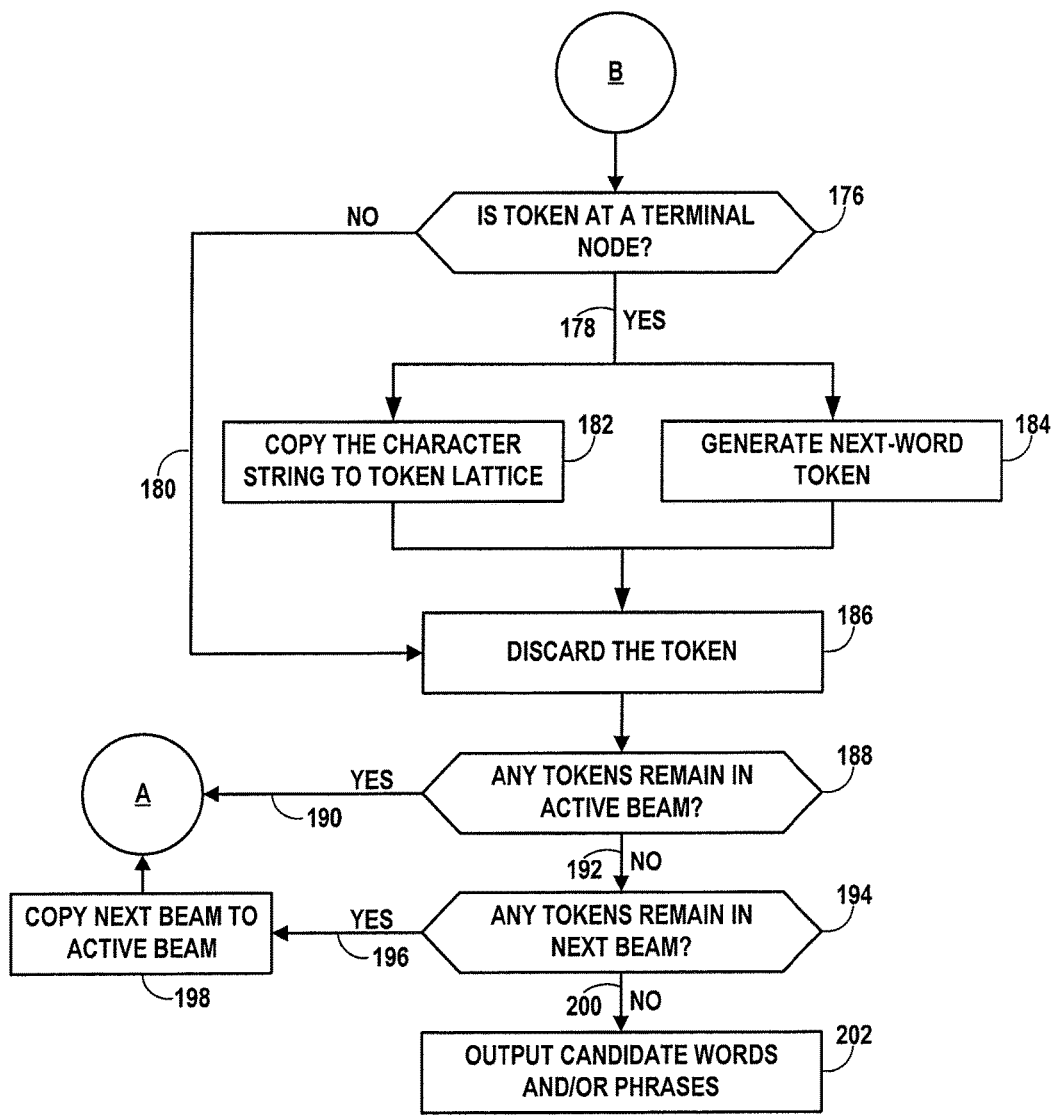

FIGS. 6A-6B are flow diagrams illustrating example operations of a computing device to determine a word and/or phrase from a gesture, in accordance with one or more techniques of the present disclosure. For purposes of illustration only, the example operations are described below within the context of computing device 2, as shown for example, in FIGS. 1, 2 and 5.

In the example of FIGS. 6A-6B, computing device 2 may initially output a graphical keyboard (e.g., graphical keyboard 16B) comprising a plurality of keys for display (150). Computing device 2 may detect a gesture at the presence-sensitive display (152). For example, presence-sensitive display 4 may detect a gesture having gesture path 140. UI module 6, executing on one or more processors, may receive an indication of the gesture detected at presence-sensitive display 4. In response to receiving the indication of the gesture detected at the presence-sensitive display, computing device 2 may generate a word-level token having a cost value of zero at the entry node of a lexicon stored on computing device 2 as a lexicon trie (154). Computing device 2 may push the word-level token into an active beam (156). For instance, computing device 2 may push the word-level token into active beam 56.

Computing device 2 may select a word-level token from the active beam (158). Computing device 2 may create a copy of the word-level token on each child node of the word-level token (160). Computing device 2 may select a word-level token copy (162) and determine an alignment point along the gesture (164). Computing device 2 may determine a cost value representing a probability that the alignment point indicates the letter key of the node on which the word-level token copy is positioned and add the cost value to the word-level token copy (166). Computing device 2 may push the word-level token copy into a next beam (168). Computing device 2 may determine whether there are any word-level token copies remaining in the active beam (170). If there are word-level token copies remaining (172), computing device 2 may select a new word-level token copy (162).

If there are not any word-level token copies remaining (174), computing device 2 may determine whether the word-level token is at a terminal node of the lexicon trie (176). For instance, computing device 2 may use language model 12 to determine whether the word-level token represents a candidate word included in a lexicon (e.g., the English language). If the word-level token is at a terminal node (178), computing device 2 may create an edge in token lattice 110 as described in FIG. 5 wherein the edge corresponds to the letter chain (e.g., candidate character string) indicated by the terminal node (182). Computing device 2 may, as described in FIG. 5 generate a next-word token that indicates that a next selected key of the plurality of keys of the graphical keyboard is a prefix of a second word-level token (184). After copying the candidate character string to token lattice 110 and generating the next-word token, or if the word-level token is not at a terminal node (180), computing device 2 may discard the word-level token (186).

Computing device 2 may determine whether any word-level tokens remain in the active beam (188). If there are word-level tokens remaining in the active beam (190), computing device 2 may select a new word-level token from the active beam (158). If there are no word-level tokens remaining in the active beam (192), computing device 2 may determine whether any word-level tokens remain in the next beam (194). If there are word-level tokens remaining in the next beam (196), computing device 2 may copy the next beam to the active beam (198) and select a new word-level token from the active beam (158). If there are no word-level tokens remaining in the next beam (200), computing device 2, in some examples, determines the next indication of user input, e.g., touch event (202).

Figure 7:
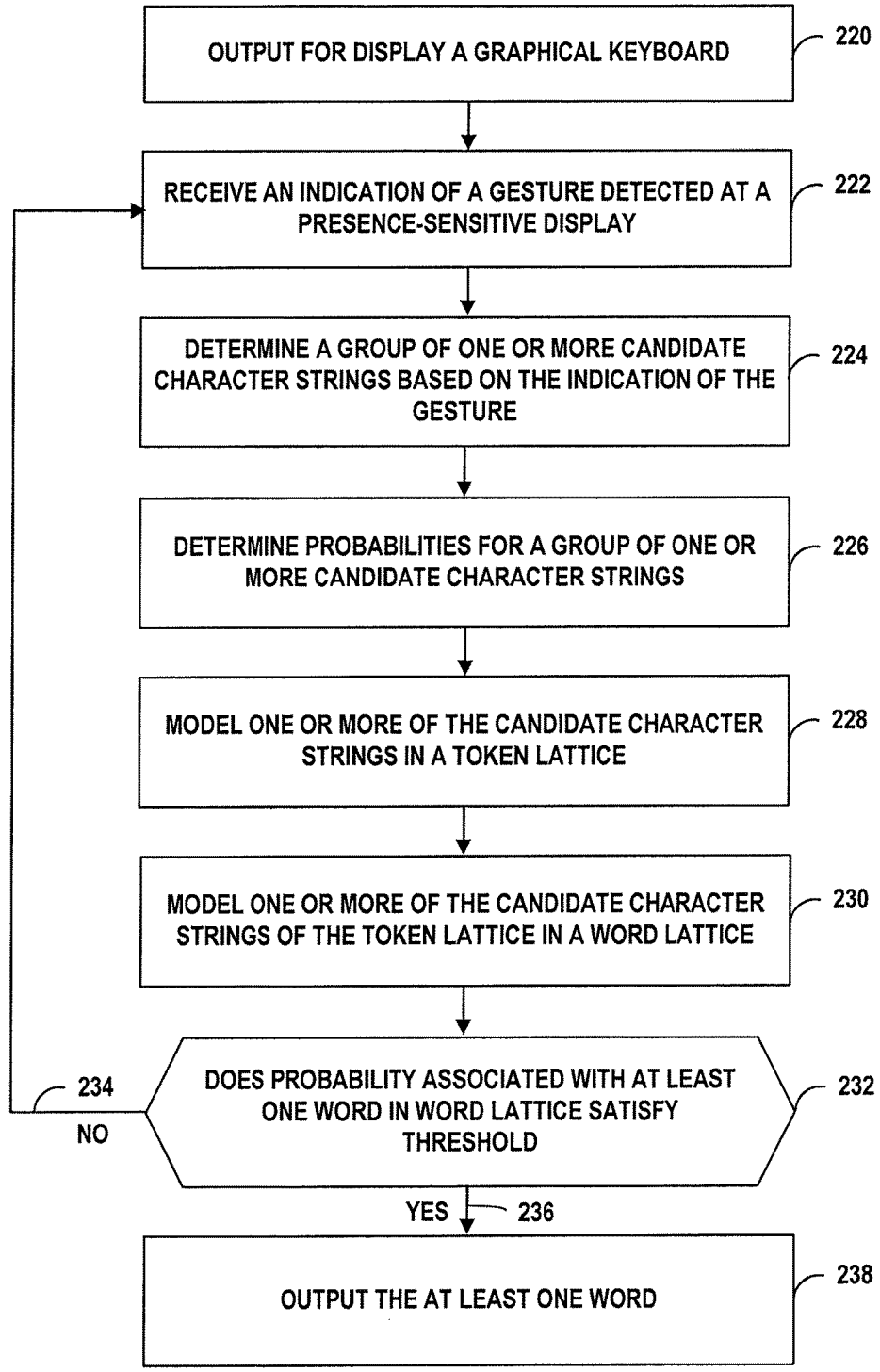
FIG. 7 is a flow diagram illustrating example operations of a computing device to determine one or more characters and/or words of a second language based at least in part on user input to select characters included in an alphabet of a first language, in accordance with one or more aspects of the present disclosure.

FIG. 7 is a flow diagram illustrating example operations of a computing device to determine one or more characters and/or words of a second language based at least in part on user input to select characters included in an alphabet of a first language, in accordance with one or more aspects of the present disclosure. For purposes of illustration only, the example operations are described below within the context of computing device 2, as shown in FIGS. 1 and 2.

Computing device 2 may initially output for display, a graphical keyboard comprising a plurality of keys (220). For example, computing device 2 may output a QWERT keyboard for display at presence-sensitive display 4. Computing device 2 may receive an indication of a gesture detected at the presence-sensitive display (222). For instance computing device 2 may receive a tap input, a continuous gesture, and/or a combination thereof. In this way, a user could mix both swiping and tapping, such that the user may perform a continuous gesture to swipe in a portion of the candidate character string (e.g., pinyin string) and tap the remaining portion of the candidate character string.

In response to receiving the indication of the gesture, computing device 2 may determine a group of one or more candidate character strings based on the indication of the gesture (224). For example, computing device 2 may model one or more tap inputs on a lattice such as character lattice 100. Computing device 2 may determine one or more candidate character strings from the character lattice as described in FIG. 4 and create edges in token lattice 110. In some examples, computing device 2 may determine one or more candidate character strings based on a lexicon tie as described in FIGS. 5-6B. For instance, as described in FIGS. 5-6B, computing device 2 may determine one or more candidate character strings, and model the character strings in token lattice 110.

In some examples, computing device 2 may determine probabilities for a group of one or more candidate character strings (226). For example, computing device 2 may determine spatial model probabilities for one or more of the candidate character strings. As described in FIGS. 4-6B, computing device 2 may determine a spatial model probability for a candidate character string based on the respective spatial model probabilities for one or more characters in the candidate character string that correspond to one or more keys of the graphical keyboard.

In some examples, computing device 2 may model the one or more candidate character strings in token lattice 110 (228). For instance, computing device 2 may associate a candidate character string and its corresponding spatial model probability with an edge in token lattice 110. Computing device 2 may further model one or more of the candidate character strings of token lattice 110 in word lattice 120 (230). In one example, computing device 2 may traverse token lattice 110 to determine paths with the highest probabilities. Computing device 2 may concatenate multiple candidate character strings from token lattice 110 and associate the concatenation of the character strings with an edge of word lattice 120.

Computing device 2 may determine a probability associated with the concatenation, which may be associated with the edge as the edge weight. Computing device 2 may then use to determine whether such a concatenation of candidate character strings corresponds to one or more words in a language. For instance, a higher probability associated with an edge in word lattice 120 may indicate greater likelihood that the user intended to enter the word associated with the edge. Thus, in some examples, computing device 2 may determine whether a probability associated with a word in the word lattice satisfies a threshold (232). For instance, if the probability satisfies the threshold (236) (e.g., the probability is greater than the threshold), computing device 2 may output the at least one word for display (238). If the probability does not satisfy a threshold, computing device 2 may not output the at least one word for display (234). In some examples, computing device 2 may perform the techniques of FIG. 7 incrementally computing device 2 determines indications of user input. That is, for each tap input and/or each portion of a gesture input, computing device 2 may incrementally determine words using the character lattice to output for display.

Figure 8:
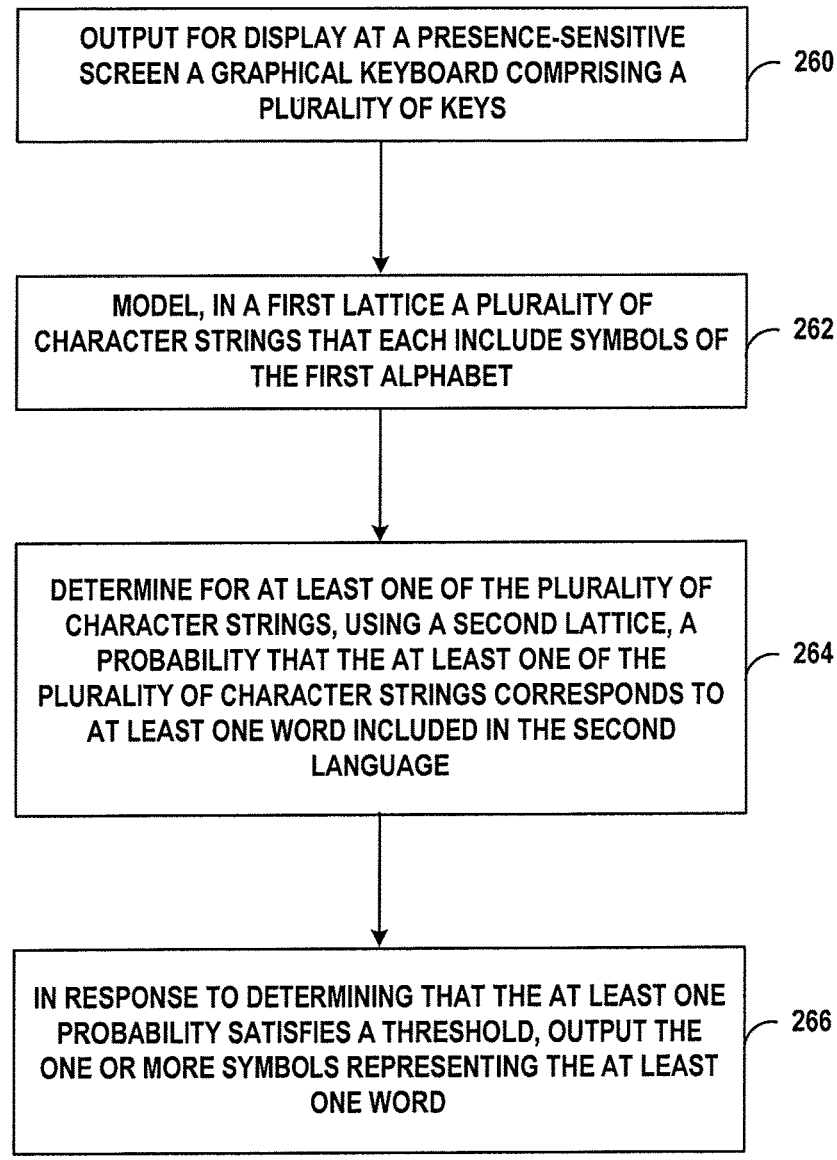
FIG. 8 is a flow diagram illustrating example operations of a computing device to determine one or more characters and/or words of a second language based at least in part on user input to select characters included in an alphabet of a first language, in accordance with one or more aspects of the present disclosure.

FIG. 8 is a flow diagram illustrating example operations of a computing device to determine one or more characters and/or words of a second language based at least in part on user input to select characters included in an alphabet of a first language, in accordance with one or more aspects of the present disclosure. For purposes of illustration only, the example operations are described below within the context of computing device 2, as shown in FIGS. 1 and 2.

Computing device 2 may initially output for display, a graphical keyboard comprising a plurality of keys (260). In some examples, at least one of the plurality of keys is associated with one or more symbols that are included in a first alphabet of a first language. In response to receiving an indication of at least one gesture detected at presence-sensitive display 4 (which may include a presence-sensitive input device), computing device 2 may model, in a first lattice, a plurality of character strings that each include symbols of the first alphabet (262). In some examples, the first lattice indicates spatial probabilities of each of the plurality of character strings, where the spatial probabilities are based at least in part on the indication of the at least one gesture.

Computing device 2, in some examples, may determine for at least one of the plurality of character strings, using a second lattice that indicates probabilities of one or more words of a second language based at least in part on the spatial probabilities of the plurality of character strings, a probability that the at least one of the plurality of character strings corresponds to at least one word included in the second language (264). In some examples, the at least one word is represented by one or more symbols of a second alphabet corresponding to the second language. In some examples, computing device 2 may in response to determining that the at least one probability satisfies a threshold, output for display, the one or more symbols representing the at least one word (266).

In one example, the method may include determining, by the computing device, a group of characters included in a candidate character string of the plurality of candidate character strings; determining, by the computing device, spatial model probabilities of keys corresponding to characters included in the candidate character string; determining, by the computing device, a collective spatial model probability of the candidate character string based at least in part on the spatial model probabilities of keys corresponds to characters included in the candidate character string; and generating, by the computing device, an edge in the first lattice, wherein the candidate character string and the collective spatial model probability of the character string are associated with the edge.

In one example, the method may include determining, by the computing device, spatial model probabilities of keys of the graphical keyboard that are proximal to a location of the tap input; generating, by the computing device, edges in a third lattice that each correspond to the keys of the graphical keyboard that are proximal to the location of the tap input; associating, by the computing device and with the edges, characters of the graphical keyboard that are proximal to the location of the tap input and respective spatial model probabilities of the keys the graphical keyboard that are proximal to the location of the tap input; determining, by the computing device, a plurality of edges in the third lattice; and generating, by the computing device, an edge in the first lattice that is associated with a candidate character string, wherein the candidate character string is generated based at least in part on the plurality of edges in the third lattice.

In one example, the method may include determining, by the computing device, that a first spatial model probability of a first candidate character string satisfies a threshold, wherein the first candidate character string corresponds to a first edge of the first lattice, wherein the first edge originates from a first vertex and ends at a second vertex; determining, by the computing device, that a second spatial model probability of a second candidate character string satisfies the threshold, wherein the second candidate character string corresponds to a second edge of the first lattice, wherein the second edge originates from the second vertex and ends at a third vertex; and generating, by the computing device a third edge in the second lattice that indicates a probability of the at least one word included in the second language, based at least in part on the first spatial model probability and the second spatial model probability.

In one example, the method may include concatenating, by the computing device, the first candidate character string and the second candidate character string to generate a third candidate character string; associating, by the computing device the third candidate character string with the third edge in the second lattice; and determining, by the computing device, the probability of the third candidate character string given the word in the second language.

In one example, the method may include determining, by the computing device and in response to receiving the indication of at least one gesture, a candidate character string based at least in part on a group of keys, wherein the determining comprises: determining, by the computing device, a group of alignment points traversed by the gesture; determining, by the computing device, respective cost values for each of at least two keys of the plurality of keys, wherein each of the respective cost values represents a probability that an alignment point of the group of alignment points indicates a key of the plurality of keys; in response to determining that the cost value of a combination of keys satisfies a threshold, associating, by the computing device, a candidate character string with an edge of the first lattice, wherein the character string includes characters associated with the combination of keys.

In one example, the method may include determining, by the computing device, a plurality of characters in response to receiving an indication of at least one gesture detected at a presence-sensitive input device; determining, by the computing device, at least one boundary between the plurality of characters, wherein the at least one boundary indicates a first group of characters in the plurality of characters that correspond to a first candidate character string and a second group of characters in the plurality of characters that correspond to a second candidate character string; generating, by the computing device a first edge in the first lattice that is associated with the first candidate character string, wherein the first edge originates from a first vertex and ends t a second vertex; generating, by the computing device a second edge in the first lattice that is associated with the second candidate character string, wherein the second edge originates from the second vertex and ends at a third vertex; and determining, by the computing device, the probability of the first candidate character string and the second candidate character string given the word in the second language.

FIG. 9 is a conceptual diagram illustrating lattices, which a computing device may generate based on indications of user input to select characters of an alphabet in a first language and use to determine words of a second language, in accordance with techniques of the present disclosure. FIG. 9 illustrates character lattice 100, token lattice 110, and word lattice 120 as previously described in FIG. 4. Additionally, FIG. 9 illustrates Chinese characters Z1 corresponding to 重, Z2 corresponding to 中, H corresponding to 活. FIG. 9 also illustrates Chinese word ZG that corresponds to 中国. As shown in FIG. 9 for example purposes only, word lattice 120 includes a different combination of edges (indicated by double-arrowhead edges between node boundaries 285 indicated by the dashed vertical lines extending from the corresponding nodes 281) than indicated in FIG. 4. Builder module 50 may model edges in FIG. 9 in accordance with the techniques described in FIG. 4.

FIG. 9 also illustrates Viterbi paths 280 and 282 that may be determined by decoding module 52. For instance, decoding module 52 may search through edges of word lattice 120 to find paths (collectively comprised of one or more edges) with the highest weights. As one example decoding module 52 may determine Viterbi path 280 when searching through word lattice 120. Viterbi path 280 may correspond to edge 302 of word lattice 120 that is associated with Chinese word ZG (i.e., 中国). Decoding module 52 may determine the probability P(ZG), which may correspond to the frequency or probability that the Chinese word ZG (i.e., 中国) occurs in the Chinese language. Decoding module 52 may further determine the probability P('zhong', 'guo'|ZG) in Viterbi path 280. P('zhong', 'guo'|ZG) may indicate the probability of candidate character strings 'zhong', 'guo' given the Chinese word ZG. Finally, Viterbi path 280 may include $P_{spatial}$('zhong')$P_{spatial}$('guo'), which may correspond to the respective spatial model probabilities of edges corresponding to 'zhong' and 'guo' in token lattice 110. Decoding module 52 may determine a total weight for edge 302 based on the product of the probabilities for:

P(ZG)P('zhong', 'guo'|ZG)$P_{spatial}$('zhong')$P_{spatial}$ ('guo')

Decoding module 52 may determine Viterbi paths for any number of edges in word lattice 120. For instance, as shown in FIG. 9, decoding module 52 may also determine Viterbi path 282 for edges 304 and 306 in word lattice 120. Decoding module 52 may determine the probability P(Z1), which may correspond to the frequency or probability that the Chinese character Z1 (i.e., 重) occurs in the Chinese language. The probability P(Z1) may be referred to as a unigram probability. Decoding module 52 may further determine the probability P(H|Z1) in Viterbi path 282. The probability P(H|Z1) may correspond to the probability of character H given the occurrence of character Z1. There the probability P(H|Z1) may correspond to a bigram probability. Decoding module 52 may also determine the probability P('zhong'|Z1) corresponding to edge 304. P('zhong'|Z1) may represent the probability of the candidate character string 'zhong' given the Chinese character Z1. Similarly, decoding module 52 may determine the probability P('huo'|H) corresponding to edge 306. P('huo'|H) may represent the probability of the candidate character string 'huo' given the Chinese character H. Decoding module 52 may determine $P_{spatial}$('zhong')$P_{spatial}$('huo') corresponding to the spatial model scores of edges 304 and 306 that are determined from the corresponding edges in token lattice 110. Decoding module 52 may determine a total weight for a path that includes edges 304 and 306 based on the product of the probabilities for:

P(Z1)P(H|Z1)P('zhong'|Z1)P('huo'|H)$P_{spatial}$('zhong') $P_{spatial}$('huo')

Finally, equation 283 indicates that, in some examples, decoding module 52 may search for edges in word lattice 120 with the highest probabilities based on spatial and language model scores. For instance, P(t) may correspond to the probability of a character, word, or multi-word phrase in a second language; P(s'|t) may correspond the probability of one or more candidate character strings given a character, word, or multi-word phrase in a second language; and P(s|s') may correspond the spatial model probability of one or more candidate character strings.

FIG. 9 further illustrates user interface (UI) element 284. In some examples, decoding module 52 may send data to UI module 6 that causes presence-sensitive display 4 to output UI element 284. UI element 284 may present one or more characters, words, and/or multi-word phrases of a second language that are determined based on the techniques of the disclosure. For instance, initially a user may provide one or more indications of user input to enter 'zhong'. Based on techniques of the disclosure, decoding module 52 may determine edge 304 of word lattice 120 corresponding to 'zhong'. Decoding module 52 may determine that the score associated with edge 304 is one of a group of highest scores that satisfies a threshold and therefore sends data to UI module 6 that causes presence-sensitive display 4 to output character "巾" 288 corresponding to edge 304. Decoding module 52 may further determine that the score associated with edge 302 is included in the group of highest scores that satisfies the threshold and therefore outputs "巾国" as illustrated in 284.

In some examples, the user may provide an indication of user input to select character "中" 288, for example, by gesturing at the location of presence-sensitive display 4 screen that outputs character "中" 288. In response to determining an indication of the gesture, UI module 6 may cause presence-sensitive display 4 to output character "中" 209 in place of 'zhong' that was previously displayed by presence-sensitive display 4. Decoding module 52, upon determining the indication of the gesture to select character "中" 288 may also determine one or more paths in word lattice 120 that include an edge associated with 'zhong', such as a path in word lattice 120 that includes edges 304 and edge 306. Decoding module 52 may also determine edges 308 and 310. Since the indication of user input selected 'zhong', decoding module 52 may determine candidate character strings that are associated with edges in a path that includes 'zhong'. For instance, decoding module 52 may output candidate character strings 'guo' and 'huo' that correspond, respectively, to edges 306 and 310 which further corresponding to edges 304 and 308 associated with 'zhong'. Computing device 294 may receive a subsequent indication of user input to select candidate character string 300. As shown in FIG. 9, decoding module 52 may have previously caused presence-sensitive display 4 to output 'guo' because the edges associated with 'zhongguo' may have had a highest weight in word lattice 120 and may therefore have output as the most probable word. However, because the user selected candidate character string 300 corresponding to 'huo', UI module 6 may cause presence-sensitive display 4 to output character '活' corresponding 'huo', such that "中 guo" is replaced in UI element 284 with "中活" for display. In this way, as a user incrementally provides indications of user input, the user may select the desired character, word, or multi-word phrase displayed in UI element 284 that is determined based on word lattice 120 and decoding module 52.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the embodiment, certain acts or events of any of the methods described herein can be performed in a different sequence, may be added, merged, or left out all together (e.g., not all described acts or events are necessary for the practice of the method). Moreover, in certain embodiments, acts or events may be performed concurrently, e.g., through multi-threaded processing, interrupt processing, or multiple processors, rather than sequentially.

Various examples have been described. These and other examples are within the scope of the following claims.

What is claimed is:

1. A computer-implemented method, comprising:
   outputting, by a computing device having one or more processors and a presence-sensitive display device, a graphical keyboard comprising a plurality of keys associated with characters of a first alphabet of a first language,
   receiving, at the computing device, a user input comprising one or more touches on the presence-sensitive display device,
   constructing, at the computing device, a character lattice corresponding to the user input based on a spatial model, the character lattice being indicative of a spatial probability of one or more potential characters corresponding to the user input,
   constructing, at the computing device, a token lattice corresponding to the user input based on the character lattice, the token lattice being indicative of a collective spatial probability of one or more potential tokens corresponding to the user input, wherein each of the one or more potential tokens corresponds to a character candidate string comprising a group of characters representing a semantic or phonetic unit,
   constructing, at the computing device, a word lattice corresponding to the user input based on the token lattice and a language model, the word lattice being indicative of a probability of one or more potential words corresponding to the user input, the one or more potential words comprising one or more characters of a second alphabet of a second language,
   selecting, at the computing device, at least one particular potential word of the one or more potential words based on the word lattice, and
   outputting, via the presence-sensitive display device, the at least one particular potential word.

2. The computer-implemented method of claim 1, wherein:
   each of the one or more touches of the user input is associated with a location of the presence-sensitive display device;
   the spatial model is configured to determine a likelihood that each of the locations of the one or more touches corresponds to one or more particular potential characters; and
   constructing the character lattice corresponding to the user input based on the spatial model is based on the likelihoods and the locations.

3. The computer-implemented method of claim 1, wherein constructing the token lattice corresponding to the user input based on the character lattice comprises:
   determining a start character and an end character in the character lattice for each character candidate string of the token lattice,
   wherein determining the start character and the end character is based on at least one of: a time window, a keystroke quantity window, a lexicon trie that includes possible candidate character strings, a length threshold corresponding to probable lengths of possible candidate character strings, and an intermediate token lattice that models commonly misspelled candidate character strings.

4. The computer-implemented method of claim 1, wherein the collective spatial probability of each particular token of the one or more potential tokens comprises a combination of the spatial probability of the group of characters of that particular token.

5. The computer-implemented method of claim 1, wherein selecting the at least one particular potential word of the one or more potential words based on the word lattice comprises:
   comparing the probability of each particular word of the one or more potential words corresponding to the user input to a threshold; and
   selecting that particular word when its associated probability satisfies the threshold.

6. The computer-implemented method of claim 1, wherein the one or more touches of the user input comprises a tap touch, a continuous touch, or a combination thereof.

7. The computer-implemented method of claim 1, wherein the language model is indicative of a language model probability representative of a likelihood of a particular token of the one or more potential tokens given a particular potential word in the word lattice.

8. A computing device, comprising:
a presence-sensitive display device;
one or more processors coupled to the presence-sensitive display device; and
a non-transitory computer-readable storage medium storing instructions that, when executed by the one or more processors, cause the one or more processors to perform operations, the operations comprising:
outputting, via the presence-sensitive display device, a graphical keyboard comprising a plurality of keys associated with characters of a first alphabet of a first language,
receiving a user input comprising one or more touches on the presence-sensitive display device,
constructing a character lattice corresponding to the user input based on a spatial model, the character lattice being indicative of a spatial probability of one or more potential characters corresponding to the user input,
constructing a token lattice corresponding to the user input based on the character lattice, the token lattice being indicative of a collective spatial probability of one or more potential tokens corresponding to the user input, wherein each of the one or more potential tokens corresponds to a character candidate string comprising a group of characters representing a semantic or phonetic unit,
constructing a word lattice corresponding to the user input based on the token lattice and a language model, the word lattice being indicative of a probability of one or more potential words corresponding to the user input, the one or more potential words comprising one or more characters of a second alphabet of a second language,
selecting at least one particular potential word of the one or more potential words based on the word lattice, and
outputting, via the presence-sensitive display device, the at least one particular potential word.

9. The computing device of claim 8, wherein:
each of the one or more touches of the user input is associated with a location of the presence-sensitive display device;
the spatial model is configured to determine a likelihood that each of the locations of the one or more touches corresponds to one or more particular potential characters; and
constructing the character lattice corresponding to the user input based on the spatial model is based on the likelihoods and the locations.

10. The computing device of claim 8, wherein constructing the token lattice corresponding to the user input based on the character lattice comprises:
determining a start character and an end character in the character lattice for each character candidate string of the token lattice,
wherein determining the start character and the end character is based on at least one of: a time window, a keystroke quantity window, a lexicon trie that includes possible candidate character strings, a length threshold corresponding to probable lengths of possible candidate character strings, and an intermediate token lattice that models commonly misspelled candidate character strings.

11. The computing device of claim 8, wherein the collective spatial probability of each particular token of the one or more potential tokens comprises a combination of the spatial probability of the group of characters of that particular token.

12. The computing device of claim 8, wherein selecting the at least one particular potential word of the one or more potential words based on the word lattice comprises:
comparing the probability of each particular word of the one or more potential words corresponding to the user input to a threshold; and
selecting that particular word when its associated probability satisfies the threshold.

13. The computing device of claim 8, wherein the one or more touches of the user input comprises a tap touch, a continuous touch, or a combination thereof.

14. The computing device of claim 8, wherein the language model is indicative of a language model probability representative of a likelihood of a particular token of the one or more potential tokens given a particular potential word in the word lattice.

15. A non-transitory computer-readable storage medium storing instructions that, when executed by one or more processors, cause the one or more processors to perform operations, the operations comprising:
outputting, via a presence-sensitive display device, a graphical keyboard comprising a plurality of keys associated with characters of a first alphabet of a first language,
receiving a user input comprising one or more touches on the presence-sensitive display device,
constructing a character lattice corresponding to the user input based on a spatial model, the character lattice being indicative of a spatial probability of one or more potential characters corresponding to the user input,
constructing a token lattice corresponding to the user input based on the character lattice, the token lattice being indicative of a collective spatial probability of one or more potential tokens corresponding to the user input, wherein each of the one or more potential tokens corresponds to a character candidate string comprising a group of characters representing a semantic or phonetic unit,
constructing a word lattice corresponding to the user input based on the token lattice and a language model, the word lattice being indicative of a probability of one or more potential words corresponding to the user input, the one or more potential words comprising one or more characters of a second alphabet of a second language,
selecting at least one particular potential word of the one or more potential words based on the word lattice, and
outputting, via the presence-sensitive display device, the at least one particular potential word.

16. The computer-readable storage medium of claim 15, wherein:
each of the one or more touches of the user input is associated with a location of the presence-sensitive display device;
the spatial model is configured to determine a likelihood that each of the locations of the one or more touches corresponds to one or more particular potential characters; and
constructing the character lattice corresponding to the user input based on the spatial model is based on the likelihoods and the locations.

17. The computer-readable storage medium of claim 15, wherein constructing the token lattice corresponding to the user input based on the character lattice comprises:
- determining a start character and an end character in the character lattice for each character candidate string of the token lattice,
- wherein determining the start character and the end character is based on at least one of: a time window, a keystroke quantity window, a lexicon trie that includes possible candidate character strings, a length threshold corresponding to probable lengths of possible candidate character strings, and an intermediate token lattice that models commonly misspelled candidate character strings.

18. The computer-readable storage medium of claim 15, wherein the collective spatial probability of each particular token of the one or more potential tokens comprises a combination of the spatial probability of the group of characters of that particular token.

19. The computer-readable storage medium of claim 15, wherein selecting the at least one particular potential word of the one or more potential words based on the word lattice comprises:
- comparing the probability of each particular word of the one or more potential words corresponding to the user input to a threshold; and
- selecting that particular word when its associated probability satisfies the threshold.

20. The computer-readable storage medium of claim 15, wherein the one or more touches of the user input comprises a tap touch, a continuous touch, or a combination thereof.

21. The computer-readable storage medium of claim 15, wherein the language model is indicative of a language model probability representative of a likelihood of a particular token of the one or more potential tokens given a particular potential word in the word lattice.

* * * * *